United States Patent
John Wilson et al.

(10) Patent No.: US 11,864,200 B2
(45) Date of Patent: *Jan. 2, 2024

(54) CONTROL CHANNEL MAPPING WITHIN SEARCH SPACE FOR WIRELESS SYSTEMS

(71) Applicant: QUALCOMM Incorporated, San Diego, CA (US)

(72) Inventors: Makesh Pravin John Wilson, San Diego, CA (US); Tao Luo, San Diego, CA (US); Heechoon Lee, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,996

(22) Filed: Jul. 12, 2022

(65) Prior Publication Data

US 2022/0353852 A1 Nov. 3, 2022

Related U.S. Application Data

(63) Continuation of application No. 16/238,720, filed on Jan. 3, 2019, now Pat. No. 11,395,277.

(Continued)

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0037* (2013.01); *H04L 5/0053* (2013.01);
(Continued)

(58) Field of Classification Search
CPC . H04W 72/23; H04W 72/0446; H04W 24/08; H04L 5/0037; H04L 5/0053; H04L 5/0082; H04L 5/0094
(Continued)

(56) References Cited

U.S. PATENT DOCUMENTS 10,085,249 B2 9/2018 Park et al.
10,582,492 B2 3/2020 Lee et al.
(Continued)

FOREIGN PATENT DOCUMENTS

CN 105766043 A 7/2016
WO WO2018030803 A1 2/2018
(Continued)

OTHER PUBLICATIONS

International Search Report and Written Opinion—PCT/US2019/012353—ISA/EPO—dated Apr. 4, 2019.
(Continued)

*Primary Examiner* — Rownak Islam
(74) *Attorney, Agent, or Firm* — Holland & Hart / Qualcomm

(57) ABSTRACT

Methods, systems, and devices for wireless communications are described. A user equipment (UE) may receive a downlink message that includes a control channel monitoring periodicity and control channel offset for a radio frame. A UE may identify a set of slots within a radio frame to monitor for downlink control information (DCI) based on the received downlink message. The UE may identify a control channel candidate within a search space of each slot of the set of slots, and may identify the control channel candidate of a first slot based on calculations that include a current slot and a previous slot. There may be one or more slots that occur between the previous slot and the current
(Continued)

slot. The UE may receive DCI that is user-specific based on the identified control channel candidate.

30 Claims, 19 Drawing Sheets

Related U.S. Application Data

(60) Provisional application No. 62/617,082, filed on Jan. 12, 2018.

(51) Int. Cl.
*H04W 24/08* (2009.01)
*H04W 72/0446* (2023.01)

(52) U.S. Cl.
CPC .......... *H04L 5/0082* (2013.01); *H04L 5/0094* (2013.01); *H04W 24/08* (2013.01); *H04W 72/0446* (2013.01)

(58) Field of Classification Search
USPC .......................................................... 370/328
See application file for complete search history.

(56) References Cited

U.S. PATENT DOCUMENTS

| | | |
|---|---|---|
| 10,973,013 B2 | 4/2021 | Nogami et al. |
| 2016/0205614 A1 | 7/2016 | Ma et al. |
| 2016/0242203 A1 | 8/2016 | You et al. |
| 2017/0171839 A1 | 6/2017 | Larijani et al. |
| 2017/0223670 A1 | 8/2017 | Chen et al. |
| 2018/0310283 A1 | 10/2018 | Deenoo et al. |
| 2019/0223159 A1 | 7/2019 | John Wilson et al. |
| 2019/0230685 A1* | 7/2019 | Park .................. H04W 72/1263 |
| 2019/0306737 A1 | 10/2019 | Kwak et al. |
| 2020/0037184 A1 | 1/2020 | Harada et al. |
| 2020/0067675 A1 | 2/2020 | Takeda et al. |
| 2020/0229270 A1 | 7/2020 | Chatterjee et al. |
| 2022/0104048 A1 | 3/2022 | Kwak et al. |

FOREIGN PATENT DOCUMENTS

| | | |
|---|---|---|
| WO | WO-2018175596 A1 | 9/2018 |
| WO | WO2018204886 A1 | 11/2018 |

OTHER PUBLICATIONS

International Preliminary Report on Patentability—PCT/US2019/012353, The International Bureau of WIPO—Geneva, Switzerland, dated Jul. 23, 2020.

Nokia et al: "Remaining Details on Search Space," 3GPP Draft; R1-1720507_SEARCHSPACE, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017, XP051369235, 10 pages, Retrieved from the Internet: URL: http://www.3gpp.org/ftp/tsg%5Fran/WG1%5FRL1/TSGR1%5F91/Docs/ [retrieved on Nov. 17, 2017] sections 1-3.

NTT Docomo Inc: "Offline Summary for AI 7.3.1.2 Remaining Details on Search Space", 3GPP TSG RAN WG1 Meeting 91, 3GPP Draft, R1-1721414, 3rd Generation Partnership Project (3GPP), Mobile Competence Centre, 650, Route Des Lucioles, F-06921 Sophia-Antipolis Cedex, France, vol. Ran WG1, No. Reno, USA, Nov. 27, 2017-Dec. 1, 2017, Nov. 28, 2017 (Nov. 28, 2017), XP051363871, 24 Pages. Retrieved from the Internet: URL: http://www.3gpp.org/ftp/Meetings_3GPP_SYNC/RAN1/Docs/ [retrieved on Nov. 28, 2017], Section 1.2 and 1.4, p. 1, paragraph 1.1-p. 3, paragraph 1.1.

European Search Report—EP22192811—Search Authority—The Hague—dated Feb. 6, 2023.

* cited by examiner

CONTROL CHANNEL MAPPING WITHIN SEARCH SPACE FOR WIRELESS SYSTEMS

CROSS REFERENCES

The present application for patent is a Continuation of U.S. patent application Ser. No. 16/238,720 by JOHN WILSON et al. entitled "CONTROL CHANNEL MAPPING WITHIN SEARCH SPACE FOR WIRELESS SYSTEMS" filed Jan. 3, 2019, which claims the benefit of U.S. Provisional Patent Application No. 62/617,082 by JOHN WILSON et al., entitled "CONTROL CHANNEL MAPPING WITHIN SEARCH SPACE FOR WIRELESS SYSTEMS," filed Jan. 12, 2018, assigned to the assignee hereof, and expressly incorporated by reference in its entirety.

BACKGROUND

The following relates generally to wireless communication, and more specifically to control channel mapping within search space for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In a wireless communications system, a base station may send control transmissions (e.g., downlink control information (DCI)) via a physical downlink control channel (PDCCH) to a UE. The UE may be configured to monitor a PDCCH within a search space, which may include multiple search candidates. For instance, each search space may include one or more search candidates, each of which may include one or more control channel elements (CCEs). The UE may be configured to monitor one or more search candidates in the search space, and may blindly decode the one or more CCEs of the search candidate to receive control information.

SUMMARY

The described techniques relate to improved methods, systems, devices, or apparatuses that support control channel mapping within one or more search spaces for wireless systems. Generally, the described techniques provide for receiving a downlink message that includes a control channel monitoring periodicity and control channel offset for a radio frame. A user equipment (UE) may identify a set of slots within a radio frame for monitoring for downlink control information (DCI) based on the received downlink message. The UE may identify a control channel candidate within a search space of each slot of the set of slots, and may identify the control channel candidate of a first slot based on calculations that include a one or both of current slot and a previous slot. In some cases, there may be one or more transmission time intervals (TTIs) (e.g., a slot, a symbol period, a mini-slot) that occur between the previous slot and the current slot. The UE may receive DCI that is user-specific based on the identified control channel candidate.

In some examples, the UE may identify the control channel elements (CCEs) of one or more search candidates by performing one or more calculations, which may be based on a current slot and a previous slot or may be iterative in nature. To identify CCEs on which to receive DCI, a UE may identify a mapping variable value to identify current and previous slots, and to identify the CCEs of one or more search candidates on which to receive DCI based on the mapping variable values.

A method of wireless communication is described. The method may include receiving, from a base station, a downlink message that indicates a control channel monitoring periodicity and a control channel offset for a radio frame, identifying, based on the control channel monitoring periodicity and the control channel offset, a set of slots within the radio frame for monitoring by a UE, identifying a control channel candidate within a search space of each slot of the set of slots, where the control channel candidate for a first slot is identified based on a second slot, and where one or more slots occur between the first slot and the second slot, and receiving DCI for the UE based on the control channel candidate.

An apparatus for wireless communication is described. The apparatus may include means for receiving, from a base station, a downlink message that indicates a control channel monitoring periodicity and a control channel offset for a radio frame, means for identifying, based on the control channel monitoring periodicity and the control channel offset, a set of slots within the radio frame for monitoring by a UE, means for identifying a control channel candidate within a search space of each slot of the set of slots, where the control channel candidate for a first slot is identified based on a second slot, and where one or more slots occur between the first slot and the second slot, and means for receiving DCI for the UE based on the control channel candidate.

Another apparatus for wireless communication is described. The apparatus may include a processor, memory in electronic communication with the processor, and instructions stored in the memory. The instructions may be operable to cause the processor to receive, from a base station, a downlink message that indicates a control channel monitoring periodicity and a control channel offset for a radio frame, identify, based on the control channel monitoring periodicity and the control channel offset, a set of slots within the radio frame for monitoring by a UE, identify a control channel candidate within a search space of each slot of the set of slots, where the control channel candidate for a first slot is identified based on a second slot, and where one or more slots occur between the first slot and the second slot, and receive DCI for the UE based on the control channel candidate.

A non-transitory computer-readable medium for wireless communication is described. The non-transitory computer-readable medium may include instructions operable to cause a processor to receive, from a base station, a downlink message that indicates a control channel monitoring periodicity and a control channel offset for a radio frame, identify, based on the control channel monitoring periodicity and the control channel offset, a set of slots within the radio frame for monitoring by a UE, identify a control channel candidate within a search space of each slot of the set of slots, where the control channel candidate for a first slot is identified based on a second slot, and where one or more slots occur between the first slot and the second slot, and receive DCI for the UE based on the control channel candidate.

In some examples of the method, apparatus, and non-transitory computer-readable medium described herein, the first slot and the second slot identified for the control channel candidate are nonconsecutive.

In some examples of the method, apparatus, and non-transitory computer-readable medium described herein, identifying the control channel candidate includes determining a value for a mapping variable for the first slot based on the value of the mapping variable for the second slot.

In some examples of the method, apparatus, and non-transitory computer-readable medium described herein, the downlink message includes an indication of a monitoring window that identifies a number of slots for monitoring by the UE.

Some examples of the method, apparatus, and non-transitory computer-readable medium described herein may further include processes, features, means, or instructions for determining groups of multiple consecutive slots for monitoring within the radio frame based on the monitoring window, the control channel monitoring periodicity, and the control channel offset.

In some examples of the method, apparatus, and non-transitory computer-readable medium described herein, the downlink message includes an indication of a modulo operation for a time duration variable, where the control channel candidate may be determined based on the modulo operation.

In some examples of the method, apparatus, and non-transitory computer-readable medium described herein, the time duration variable indicates a slot index within the radio frame.

In some examples of the method, apparatus, and non-transitory computer-readable medium described herein, identifying the control channel candidate includes determining a CCE index for a first CCE of a set of CCEs within the search space.

In some examples of the method, apparatus, and non-transitory computer-readable medium described herein, receiving DCI includes monitoring a set of PDCCH candidates within the search space based on the control channel candidate.

Some examples of the method, apparatus, and non-transitory computer-readable medium described herein may further include processes, features, means, or instructions for receiving a PDCCH payload for the UE based on the monitoring.

A method of wireless communication is described. The method may include identifying a control channel monitoring periodicity and a control channel offset for a UE, assigning, based on the control channel monitoring periodicity and the control channel offset, a set of slots within a radio frame for monitoring by the UE, identifying a control channel candidate within a search space of each slot of the set of slots, where the control channel candidate for a first slot is identified based on a second slot, and where one or more slots occur between the first slot and the second slot, and transmitting DCI for the UE based on the control channel candidate.

An apparatus for wireless communication is described. The apparatus may include means for identifying a control channel monitoring periodicity and a control channel offset for a UE, means for assigning, based on the control channel monitoring periodicity and the control channel offset, a set of slots within a radio frame for monitoring by the UE, means for identifying a control channel candidate within a search space of each slot of the set of slots, where the control channel candidate for a first slot is identified based on a second slot, and where one or more slots occur between the first slot and the second slot, and means for transmitting DCI for the UE based on the control channel candidate.

Another apparatus for wireless communication is described. The apparatus may include a processor, memory in electronic communication with the processor, and instructions stored in the memory. The instructions may be operable to cause the processor to identify a control channel monitoring periodicity and a control channel offset for a UE, assign, based on the control channel monitoring periodicity and the control channel offset, a set of slots within a radio frame for monitoring by the UE, identify a control channel candidate within a search space of each slot of the set of slots, where the control channel candidate for a first slot is identified based on a second slot, and where one or more slots occur between the first slot and the second slot, and transmit DCI for the UE based on the control channel candidate.

A non-transitory computer-readable medium for wireless communication is described. The non-transitory computer-readable medium may include instructions operable to cause a processor to identify a control channel monitoring periodicity and a control channel offset for a UE, assign, based on the control channel monitoring periodicity and the control channel offset, a set of slots within a radio frame for monitoring by the UE, identify a control channel candidate within a search space of each slot of the set of slots, where the control channel candidate for a first slot is identified based on a second slot, and where one or more slots occur between the first slot and the second slot, and transmit DCI for the UE based on the control channel candidate.

In some examples of the method, apparatus, and non-transitory computer-readable medium described herein, the first slot and the second slot identified for the control channel candidate are nonconsecutive.

In some examples of the method, apparatus, and non-transitory computer-readable medium described herein, identifying the control channel candidate includes determining a value for a mapping variable for the first slot based on the value of the mapping variable for the second slot.

Some examples of the method, apparatus, and non-transitory computer-readable medium described herein may further include processes, features, means, or instructions for transmitting a downlink message that indicates the control channel monitoring periodicity and the control channel offset.

In some examples of the method, apparatus, and non-transitory computer-readable medium described herein, the downlink message includes an indication of a monitoring window that identifies a number of slots for monitoring by the UE.

Some examples of the method, apparatus, and non-transitory computer-readable medium described herein may further include processes, features, means, or instructions for identifying groups of multiple consecutive slots for monitoring within the radio frame based on the monitoring window, the control channel monitoring periodicity, and the control channel offset.

In some examples of the method, apparatus, and non-transitory computer-readable medium described herein, the downlink message includes an indication of a modulo operation for a time duration variable, where the control channel candidate may be identified based on the modulo operation.

In some examples of the method, apparatus, and non-transitory computer-readable medium described herein, the time duration variable indicates a slot index within the radio frame.

In some examples of the method, apparatus, and non-transitory computer-readable medium described herein, identifying the control channel candidate includes determining a CCE index for a first CCE of a set of CCEs within the search space.

In some examples of the method, apparatus, and non-transitory computer-readable medium described herein, transmitting DCI includes transmitting a PDCCH payload for the UE.

A method of wireless communication is described. The method may include receiving, from a base station in a millimeter wave (mmW) communications system, a downlink message that indicates a control channel monitoring periodicity and a control channel offset for a radio frame, identifying, based on the control channel monitoring periodicity and the control channel offset, a set of slots within the radio frame for monitoring by a UE, identifying a control channel candidate within a search space of each slot of the set of slots, where the control channel candidate for a first slot is identified based on a second slot, and receiving, via a mmW control channel, DCI for the UE based on the control channel candidate.

An apparatus for wireless communication is described. The apparatus may include means for receiving, from a base station in a mmW communications system, a downlink message that indicates a control channel monitoring periodicity and a control channel offset for a radio frame, means for identifying, based on the control channel monitoring periodicity and the control channel offset, a set of slots within the radio frame for monitoring by a UE, means for identifying a control channel candidate within a search space of each slot of the set of slots, where the control channel candidate for a first slot is identified based on a second slot, and means for receiving, via a mmW control channel, DCI for the UE based on the control channel candidate.

Another apparatus for wireless communication is described. The apparatus may include a processor, memory in electronic communication with the processor, and instructions stored in the memory. The instructions may be operable to cause the processor to receive, from a base station in a mmW communications system, a downlink message that indicates a control channel monitoring periodicity and a control channel offset for a radio frame, identify, based on the control channel monitoring periodicity and the control channel offset, a set of slots within the radio frame for monitoring by a UE, identify a control channel candidate within a search space of each slot of the set of slots, where the control channel candidate for a first slot is identified based on a second slot, and receive, via a mmW control channel, DCI for the UE based on the control channel candidate.

A non-transitory computer-readable medium for wireless communication is described. The non-transitory computer-readable medium may include instructions operable to cause a processor to receive, from a base station in a mmW communications system, a downlink message that indicates a control channel monitoring periodicity and a control channel offset for a radio frame, identify, based on the control channel monitoring periodicity and the control channel offset, a set of slots within the radio frame for monitoring by a UE, identify a control channel candidate within a search space of each slot of the set of slots, where the control channel candidate for a first slot is identified based on a second slot, and receive, via a mmW control channel, DCI for the UE based on the control channel candidate.

In some examples of the method, apparatus, and non-transitory computer-readable medium described herein, identifying the control channel candidate includes determining a value for a mapping variable for the first slot based on the value of the mapping variable for the second slot, where the first and second slots may be consecutive.

A method of wireless communication is described. The method may include identifying a control channel monitoring periodicity and a control channel offset for a UE in a mmW communications system, assigning, based on the control channel monitoring periodicity and the control channel offset, a set of slots within a radio frame for monitoring by the UE, identifying a control channel candidate within a search space of each slot of the set of slots, where the control channel candidate for a first slot is identified based on a second slot, and transmitting, via a mmW control channel, DCI for the UE based on the control channel candidate.

An apparatus for wireless communication is described. The apparatus may include means for identifying a control channel monitoring periodicity and a control channel offset for a UE in a mmW communications system, means for assigning, based on the control channel monitoring periodicity and the control channel offset, a set of slots within a radio frame for monitoring by the UE, means for identifying a control channel candidate within a search space of each slot of the set of slots, where the control channel candidate for a first slot is identified based on a second slot, and means for transmitting, via a mmW control channel, DCI for the UE based on the control channel candidate.

Another apparatus for wireless communication is described. The apparatus may include a processor, memory in electronic communication with the processor, and instructions stored in the memory. The instructions may be operable to cause the processor to identify a control channel monitoring periodicity and a control channel offset for a UE in a mmW communications system, assign, based on the control channel monitoring periodicity and the control channel offset, a set of slots within a radio frame for monitoring by the UE, identify a control channel candidate within a search space of each slot of the set of slots, where the control channel candidate for a first slot is identified based on a second slot, and transmit, via a mmW control channel, DCI for the UE based on the control channel candidate.

A non-transitory computer-readable medium for wireless communication is described. The non-transitory computer-readable medium may include instructions operable to cause a processor to identify a control channel monitoring periodicity and a control channel offset for a UE in a mmW communications system, assign, based on the control channel monitoring periodicity and the control channel offset, a set of slots within a radio frame for monitoring by the UE, identify a control channel candidate within a search space of each slot of the set of slots, where the control channel candidate for a first slot is identified based a second slot, and transmit, via a mmW control channel, DCI for the UE based on the control channel candidate.

In some examples of the method, apparatus, and non-transitory computer-readable medium described herein, the first slot and the second slot are nonconsecutive.

In some examples of the method, apparatus, and non-transitory computer-readable medium described herein, identifying the control channel candidate is based at least in part a nonconsecutive slot indices for the first and second slots.

In some examples of the method, apparatus, and non-transitory computer-readable medium described herein, identifying the control channel candidate includes determining a value for a mapping variable for the first slot based on the value of the mapping variable for the second slot, where the first and second slots may be consecutive.

DETAILED DESCRIPTION

Figure 1:
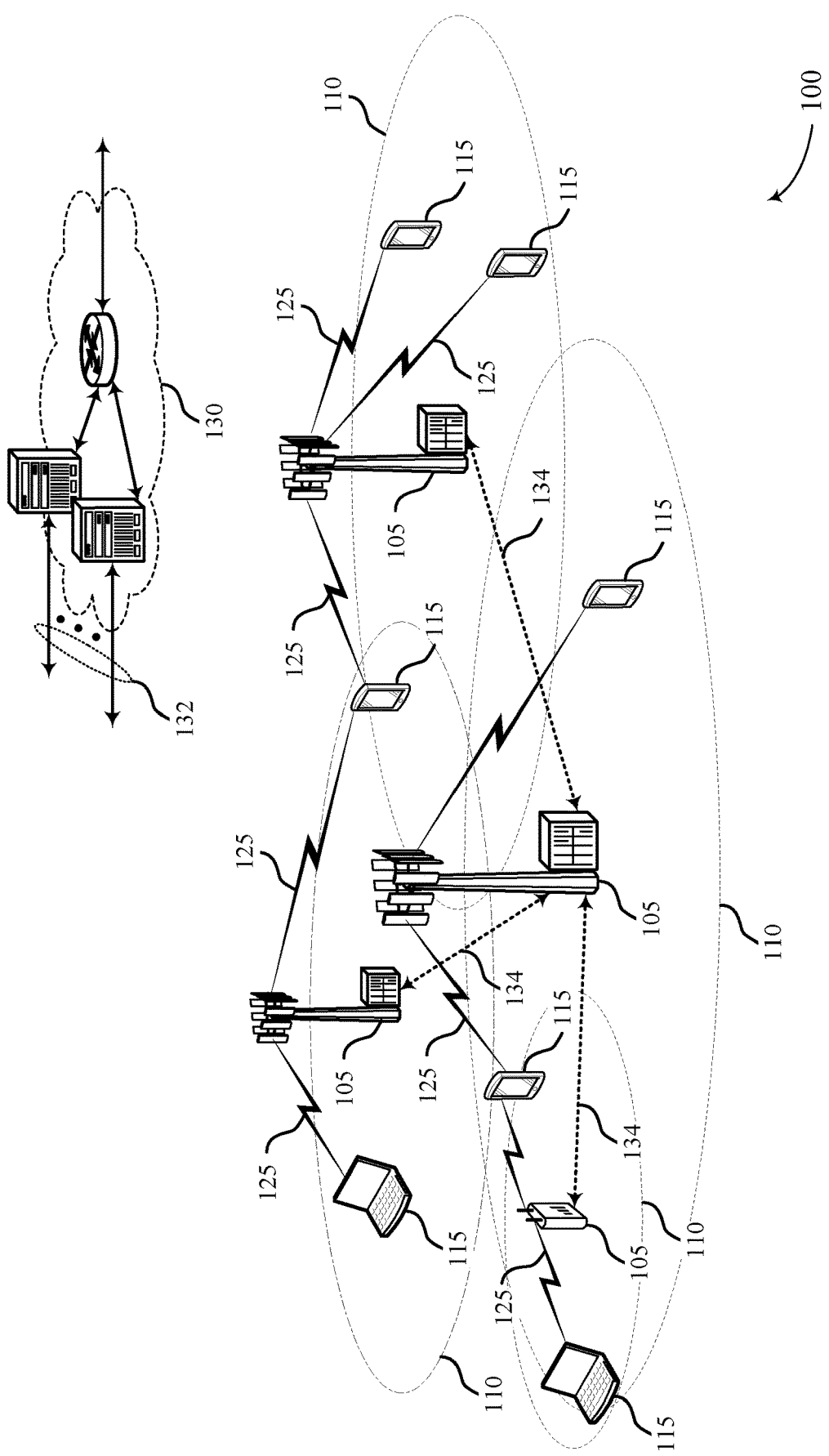
FIG. 1 illustrates an example of a wireless communications system that supports control channel mapping within search space for wireless systems in accordance with aspects of the present disclosure.

In a wireless communications system, a base station may send control transmissions (e.g., downlink control information (DCI)) via a physical downlink control channel (PDCCH) to a user equipment (UE). The UE may be configured to monitor a PDCCH within a search space, which may include multiple search candidates. For instance, each search space may include multiple control channel elements (CCEs), and may include one or more search candidates, each of which may include one or more CCEs. The UE may be configured to monitor one or more search candidates in the search space, and may blindly decode the one or more CCEs of the search candidate to receive control information.

In some systems (e.g., a millimeter wave (mmW) system), a control resource set (coreset) may include control information, such as DCI. The coreset may include multiple resource blocks in the frequency domain, and may include n orthogonal frequency division multiplexing (OFDM) symbols in the time domain (where n is an integer). The coreset may include a total set of resources allocated for control information. In some examples, the coreset may include one or more CCEs corresponding to a particular search candidate in one or more slots of a frame. The slots may or may not be contiguous, and may be indicated via higher layer signaling (e.g., radio resource control (RRC) signaling). For example, a periodicity and offset may indicate the location of slots including search candidates to be monitored by a UE. For example, if the periodicity is 5 and the offset is 0, then the search candidate may be located in slots 0, 5, 10, etc. If the periodicity is 5, and the offset is 1, then the search candidate may be located in slots 1, 6, 11, etc. The UE may monitor search spaces of the identified slots for the search candidate, which may be located, for example, in the first symbol n of the slot in which the coreset is located (where n is an integer). The UE may identify the CCEs for a search candidate based on one or more calculations. The calculations may be based on a relationship between a CCE aggregation level, a number of available CCEs for PDCCH transmission, and/or a number of search candidates. In some cases, the calculations for a current slot may also be based on a previous slot (e.g., previous consecutive slot). To identify the CCEs for monitoring, the UE may perform the calculations associated with a given slot based on a constant $k_p$, where the constant corresponds to a slot of the frame. That is, the UE may determine the location of the CCEs corresponding to the coreset in a given slot by performing calculations corresponding to a current slot ($k_p$) and a previous slot ($k_p-1$).

In some examples, $k_p$ may correspond to an absolute time. That is, if the search candidate for a coreset is located in slots 0, 5, 10, etc., then $k_p$ may represent the actual time (or slot index) of the slot within the frame. For example, $k_p$ for slot 0 may be equal to 0, and $k_p$ for slot 5 may be equal to 5. In such cases, the calculations may be backward compatible with older devices and procedures. In some examples where $k_p$ corresponds to an absolute time, the UE may perform multiple iterations of the calculations. That is, in some examples, the CCEs of the search candidate of a coreset may be located in slot 0 and slot 5 of a frame. However, the calculations of the location of the CCEs of the search candidate within slot 5 may be iterative in nature (e.g., the location of the CCEs of the search candidate is based on $k_p$ and ($k_p-1$)). Thus, in order to calculate the location of the CCEs in the fifth slot, the UE may also execute iterative calculations on the each of the five prior slots (because calculations for the slot corresponding to $k_p$ (e.g., slot 5) are based in part on slot $k_p-1$ (e.g., slot 4), and the calculations for slot $k_p-1$ (e.g., slot 4) are based in part on slot 3, and so on). This may result in higher computational complexity or greater memory requirements (where calculations may be pre-computed and stored).

In some examples, $k_p$ may correspond to a number of monitored slots within a frame. That is, $k_p$ may represent the number of slots indicated via RRC signaling to carry the coreset. For example, if the coreset is located in slots 0, 5, 10, etc., then $k_p$ may represent the consecutive number of monitored slots. In such cases, $k_p$ for slot 0 may be equal to 0, $k_p$ for slot 5 may be equal to 1, $k_p$ for slot 10 may be equal to 2, etc. When calculating the locations of the CCEs in a given slot, the UE may perform a single calculation instead of multiple iterative calculations. That is, when the coreset is located in the fifth slot (e.g., $k_p$=1), the UE may make a single calculation, because ($k_p$−1) may refer to the previous monitored slot (e.g., slot 0), instead of the next prior slot in absolute time. By calculating based on monitored slots within the frame (instead of contiguous slots with respect to time), the UE may identify the CCEs of the coreset with lower computational complexity and lesser memory requirements.

In some examples, for a given coreset, a periodicity, an offset, and a monitoring window may indicate the location of slots including search candidates to be monitored by a UE. For example, if the periodicity is 6 slots, the offset is 0 slots, and the monitoring window is 3 slots, then the search candidate may be located in slots 0, 1, 2, 6, 7, and 8, etc. If the periodicity is 6 slots, the offset is 3 slots, and the monitoring window is 3 slots, then the search candidate may be located in slots 3, 4, 5, 9, 10, 11, etc. In cases where a monitoring window is utilized and $k_p$ corresponds to an absolute time, the $k_p$ for the slots (in the example where the periodicity is 6 slots, the offset is 0 slots, and the monitoring window is 3 slots) may be equal to 0, 1, 2, 6, 7, and 8, etc. In other cases where $k_p$ corresponds to a number of monitored slots within a frame, the $k_p$ for the slots (in the example where the periodicity is 6 slots, the offset is 0 slots, and the monitoring window is 3 slots) may be equal to 0, 1, 2, 3, 4, and 5, etc.

Aspects of the disclosure are initially described in the context of wireless communications systems. Aspects of the disclosure are additionally described in terms of timelines. Aspects of the disclosure are further illustrated by and described with reference to apparatus diagrams, system diagrams, and flowcharts that relate to control channel mapping within search space for wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform-spread-OFDM (DFT-S-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a UE 115 may receive a downlink message that includes a control channel monitoring periodicity and control channel offset for a radio frame. the UE 115 may identify a set of slots within a radio frame for monitoring for DCI based on the received downlink message. The UE 115 may identify a control channel candidate within a search space of each slot of the set of slots, and may further identify the control channel candidate of a first slot based on calculations that include a current slot and a previous slot. There may be one or more slots that occur between the previous slot and the current slot (e.g., the slots may be non-consecutive). The UE 115 may receive DCI that is user-specific based on the identified control channel candidate.

Figure 2:
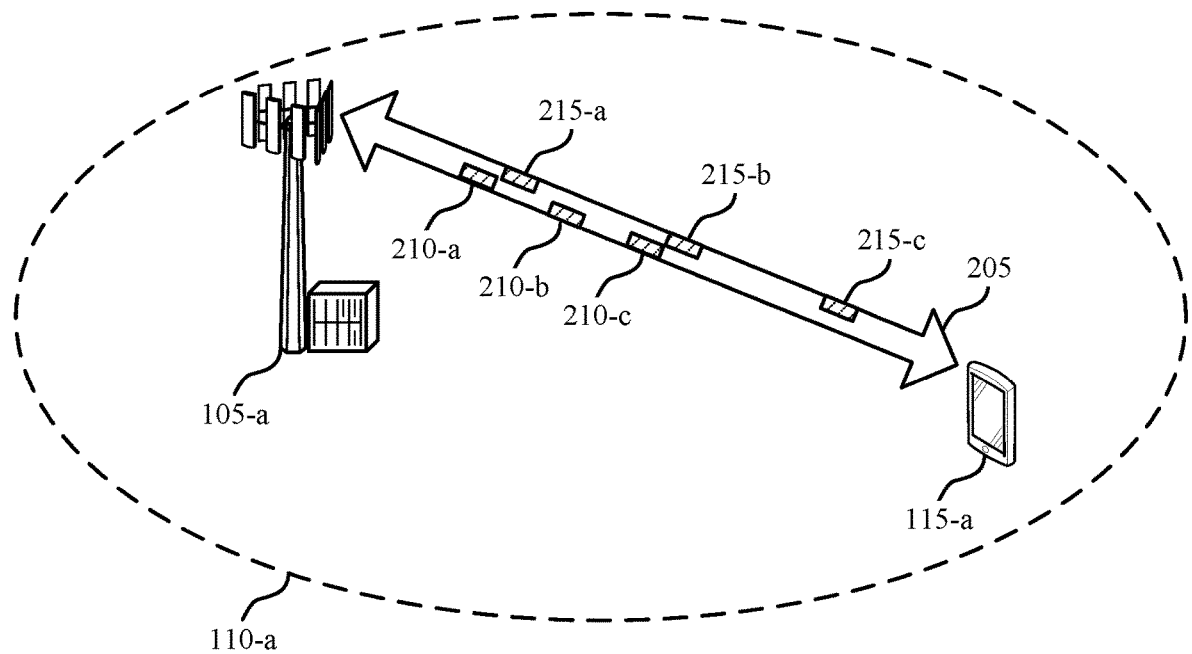
FIG. 2 illustrates an example of a wireless communications system that supports control channel mapping within search space for wireless systems in accordance with aspects of the present disclosure.

FIG. 2 illustrates an example of a wireless communications system 200 that supports control channel mapping within search space for wireless systems in accordance with various aspects of the present disclosure. In some examples, wireless communications system 200 may implement aspects of wireless communication system 100.

In some examples of wireless communications system 200, a base station 105-*a* may communicate with UE 115-*a* located within a geographic coverage area 110-*a* via a bidirectional link 205. In some examples, base station 105-*a* may send control transmissions (e.g., DCI via a PDCCH) to a UE 115-*a*. UE 115-*a* may be configured to monitor a PDCCH within a search space, which may include multiple search candidates (search candidates may be referred to as control channel candidates or PDCCH candidates). For instance, each search space may include multiple CCEs, and may include one or more search candidates, each of which may include one or more CCEs. UE 115-*a* may be configured to monitor one or more search candidates in the search space, and may blindly decode the one or more CCEs of the search candidate to receive control information.

In some examples of wireless communications 200 (e.g., a mmW system), a coreset may include control information such as DCI. The coreset may further include multiple resource blocks in the frequency domain, and n OFDM symbols in the time domain (where n is an integer). The coreset may include a total set of resources allocated for control information. In some examples, the coreset may include one or more CCEs corresponding to a particular search candidate, which may be located in one or more slots of a frame. That is, a coreset may include particular CCEs of a search candidate, which may be located across sets of contiguous or non-contiguous slots of a frame. In some examples, the slots of a coreset may be indicated via higher layer signaling (e.g., RRC signaling) on bidirectional link 205. In some examples, the CCEs of search candidates 210 or search candidates 215 of a coreset may be identified by a periodicity and an offset which may be the same or different than a periodicity and an offset for a different coreset. In one illustrative example, a coreset may have a periodicity of 5 slots and an offset of 0 slots. In such examples, search candidate 210-*a* may be located in slot 0 of a given frame, search candidate 210-*b* may be located in slot 5 of the frame, search candidate 210-*c* may be located in slot 10 of the frame, etc. In another illustrative example, search candidates 215 of a different coreset may have a periodicity of 10 slots and an offset of 1 slot. In such examples, search candidate 215-*a* may be located in slot 1 of a given frame, search candidate 210-*b* may be located in slot 11 of the frame, search candidate 210-*c* may be located in slot 21 of the frame, etc. Each of search candidates 210-*a*, 210-*b*, and 210-*c*, and 215-*a*, 215-*b*, and 215-*c*, may be a set of CCEs of a search space, and may be located in the frame based on a corresponding coreset.

In some examples, UE 115-*a* may monitor search spaces of the identified slots for one of search candidates 210 or 215. UE 115-*a* may identify the CCEs of search candidate 210 or search candidate 215 based on one or more calculations. The calculations may be based on a relationship between a CCE aggregation level, a number of available CCEs for PDCCH transmissions on bidirectional link 205, and/or a number of search candidates. The calculations for a current slot may also be based on a previous slot (e.g., a previous consecutive slot). In some examples, UE 115-*a* may perform the calculations associated with a given slot, and may identify the CCEs of search candidate 210 or search candidate 215 based on a constant $k_p$ (e.g., a value for a mapping variable), where the constant corresponds to a current slot of the frame. That is, UE 115-*a* may determine the location of the CCEs corresponding to search candidate 210 or search candidate 215 in a given slot by performing calculations corresponding to a current slot ($k_p$) and a previous slot ($k_p-1$).

In one illustrative example, a UE may perform a calculation to define the location of CCEs (e.g., a CCE index) corresponding to a search candidate represented by $m_{n_{CI}}$ for a search candidate 210, as illustrated in equation 1:

$$L \cdot \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i$$

where $n_{CI}$ is a carrier indicator field value, L represents and aggregation level, i represents a range of zero to L−1, and $N_{CCE,p}$ represents a number of CCEs in a search candidate (e.g., search candidate 210) and the number of CCEs in the search candidate is numbered from 0 to $N_{CCE}$−1.

In some examples of the predetermined equation, $Y_{p,k_p}$ may be a constant value based on a slot identifier or slot index $k_p$. For example, the $Y_{p,k_p}$ may be defined by equation 2:

$$Y_{p,k_p} = (A_p * Y_{p,k_p-1}) \bmod D$$

where $A_p$ represents a constant value ($A_0$=39827, $A_1$=39829, etc.), and D is a constant equal to 65537. The modulo operation mod D may generate a remainder, which is utilized to generate $Y_{p,k_p}$. Such constant values may be predefined, standardized, preconfigured, or indicated via higher layer signaling. In some examples, $k_p$ may represent a timing index, such as a slot index or identifier, indicating a current slot such that $k_p$−1 represents a prior slot (e.g., a previous consecutive slot). In a case where base station 105-a utilizes a common search space for transmitting PDCCH, $Y_{p,k_p}$=0. However, where a UE-specific search space is utilized by base station 105-a and UE 115-a, $Y_{p,k_p}$ may be based on a current slot number and a prior slot number (e.g., $k_p$ and $k_p$−1).

In some examples, $k_p$ may correspond to an absolute time. That is, if search candidates 210 are located in slots 0, 5, 10, etc., $k_p$ may represent the actual time of the slot within the frame. For example, $k_p$ for slot 0 (where search candidate 210-a may be located) may be equal to 0, and $k_p$ for slot 5 (where search candidate 210-b may be located) may be equal to 5, etc. In such cases, the calculations may be backward compatible with older devices and procedures. In some examples where $k_p$ corresponds to an absolute time, UE 115-a may perform multiple iterations of the calculations. For instance, slot 0 and slot 5 of a frame may include the CCEs of search candidates 210-a and 210-b, respectively. However, the calculations of the location of search candidate 210-b within slot 5 may be iterative in nature because the location of the CCEs is based on $k_p$ and ($k_p$−1). Thus, in order to calculate the location of the CCEs for search candidate 210-b in slot 5, UE 115-a may also perform iterative calculations on the each of the five prior slots, despite the fact that there is no search candidate 210 located in any of the slots between search candidate 210-a and search candidate 210-b (because calculations for the slot corresponding to $k_p$ (e.g., slot 5) are based in part on slot $k_p$−1 (e.g., slot 4), and the calculations for slot $k_p$−1 (e.g., slot 4) are based in part on slot 3, etc.). This may result in higher computational complexity or greater memory requirements (where calculations may be pre-computed and stored) at UE 115-a.

In some examples, $k_p$ may correspond to a number of monitored slots within a frame. For instance, $k_p$ may represent the number of slots in which UE 115-a may monitor for a search candidate, as indicated via radio resource control (RRC) signaling. For example, if search candidate 210-a, search candidate 210-b, and search candidate 210-c are located in slots 0, 5, and 10, respectively, then $k_p$ may represent the consecutive number of monitored slots. In such cases, $k_p$ for slot 0 may be equal to 0, $k_p$ for slot 5 may be equal to 1, $k_p$ for slot 10 may be equal to 2, etc. When calculating the locations of the CCEs in a given slot, UE 115-a may perform only a single calculation instead of multiple iterative calculations. That is, if search candidate 210-b is located in slot 5 (e.g., $k_p$=1), the UE may make a single calculation, because ($k_p$−1) may refer to the previous monitored slot where search candidate 210-a is located (e.g., slot 0), instead of the consecutive prior slot in absolute time. By calculating based on monitored slots within the frame, instead of contiguous slots with respect to time, UE 115-a may identify the CCEs of the search candidate of a coreset with lower computational complexity and lesser memory requirements.

In some examples, a periodicity, and offset, and a monitoring window may indicate the location of slots including search candidates to be monitored by UE 115-a for a given coreset. For example, if the periodicity is 6 slots, the offset is 0 slots, and the monitoring window is 3 slots, then the search candidate 210 or 215 may be located in slots 0, 1, 2, 6, 7, and 8, etc. If the periodicity is 6 slots, the offset is 3 slots, and the monitoring window is 3 slots, then the search candidate may be located in slots 3, 4, 5, 9, 10, 11, etc. Where a monitoring window is utilized, in the case where $k_p$ corresponds to an absolute time, the $k_p$ for the slots in the example where the periodicity is 6 slots, the offset is 0 slots, and the monitoring window is 3 slots may be equal to 0, 1, 2, 6, 7, and 8, etc. In some examples, where $k_p$ correspond to a number of monitored slots within a frame, the $k_p$ for the slots in the example where the periodicity is 6 slots, the offset is 0 slots, and the monitoring window is 3 slots may be equal to 0, 1, 2, 3, 4, and 5, etc.

Figure 3:
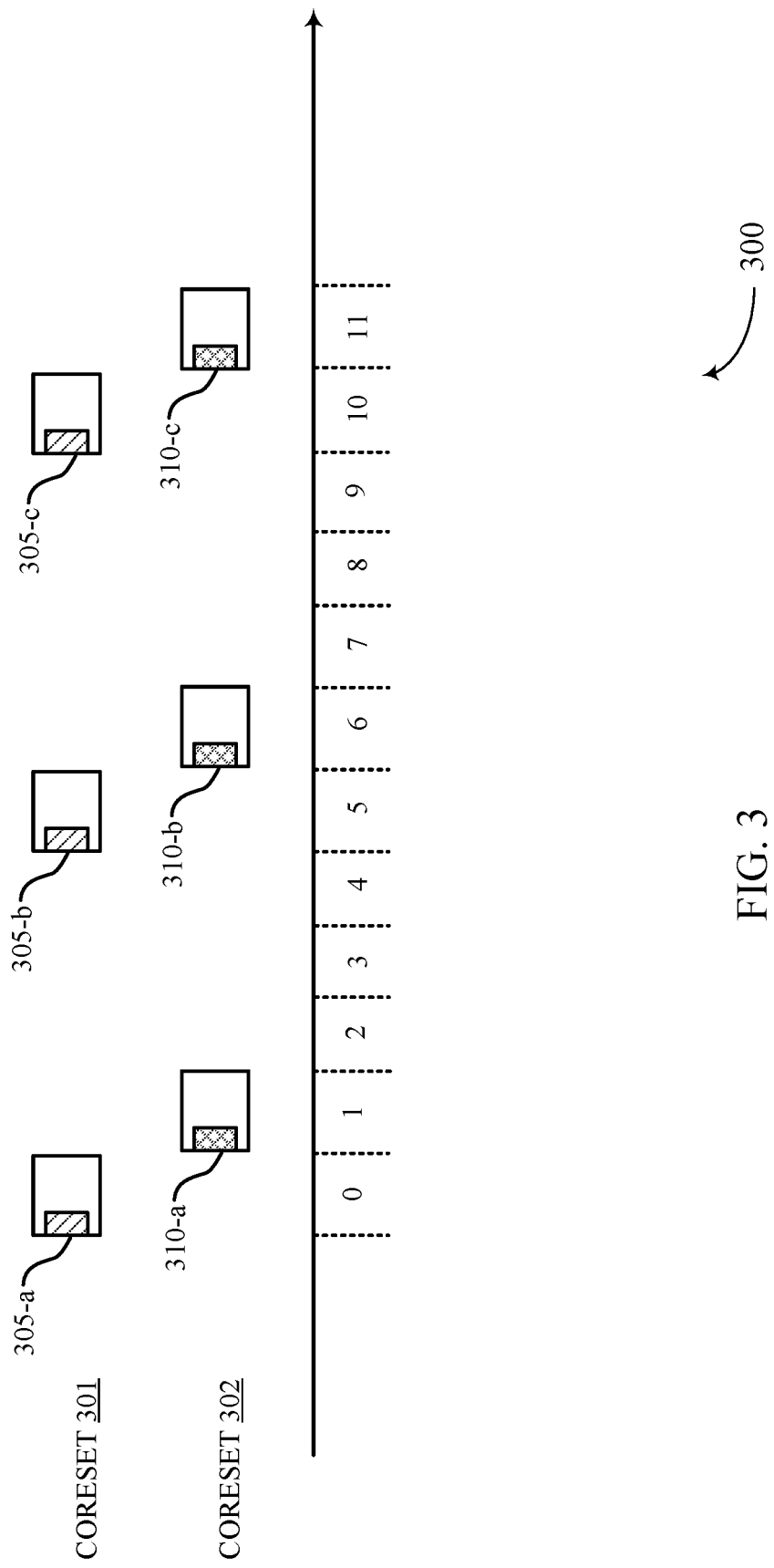
FIG. 3 illustrates an example of a timeline that supports control channel mapping within search space for wireless systems in accordance with aspects of the present disclosure.

FIG. 3 illustrates an example of a timeline 300 that supports control channel mapping within search space for wireless systems in accordance with various aspects of the present disclosure. In some examples, timeline 300 may implement aspects of wireless communications systems 100 and 200. UE 115 and base station 105 which may be examples of corresponding devices as described with reference to wireless communications systems 100, and 200, may execute techniques used in timeline 300.

In some examples of wireless communications system 100 or 200, a base station 105 may communicate with a UE 115, and may send control transmissions, such as DCI via a PDCCH. UE 115 may be configured to monitor a PDCCH within a search space, which may include multiple search candidates. In some cases, search candidates may be referred to as control channel candidates or PDCCH candidates. In some cases, each search space may include multiple CCEs, and may include one or more search candidates, each of which may include one or more CCEs. UE 115 may be configured to monitor one or more search candidates in the search space, and may blindly decode the one or more CCEs of the search candidate to receive control information.

In some examples (e.g., a mmW system), control information, such as DCI, may be included in a coreset, such as coreset 301 or coreset 302. The coreset 301 or coreset 302 may include multiple resource blocks in the frequency domain, and may include n OFDM symbols in the time domain (where n is an integer). The coreset 301 or coreset 302 may include a total set of resources allocated for control information. In some examples, the coreset 301 or coreset 302 may include one or more CCEs corresponding to a particular search candidate in one or more slots of a frame. For example, a frame with a 120 kHz numerology may have a total of 80 slots. The slots including CCEs of search candidate 305 or search candidate 310 may or may not be contiguous, and may be indicated via higher layer signaling (e.g., radio resource control (RRC) signaling). In some examples, a periodicity and an offset may identify search candidate 305 of a coreset 301 which may be the same or different than a periodicity and an offset for search candidate 310 of a coreset 302.

In one illustrative example, search candidate 305 may have a periodicity of 5 slots and an offset of 0 slots. In such examples, search candidate 305-a may be located in slot 0 of a given frame, search candidate 305-b may be located in slot 5 of the frame, search candidate 305-c may be located in slot 10 of the frame, etc. In another illustrative example, search candidate 310 may have a periodicity of 5 slots and an offset of 1 slot. In such examples, search candidate 310-a may be located in slot 1 of a given frame, search candidate 310-b may be located in slot 6 of the frame, search candidate 310-c may be located in slot 11 of the frame, etc. Each of search candidates 305-a, 305-b, and 305-c, and 310-a, 310-b, and 310-c, may be located in a particular search candidate of a search space, the search candidate including one or more CCEs.

In some examples, UE 115 may monitor search spaces of the identified slots for one of search candidate 305 or 310. UE 115 may identify the location of CCEs of a search candidate 305 or search candidate 310 based on one or more calculations. The calculations may be based on a relationship between a CCE aggregation level, a number of available CCEs for PDCCH transmissions, a number of search candidates, or a combination thereof. The calculations may further be based on a current slot and a previous slot. In some examples, UE 115 may perform the calculations, and may identify the CCEs of search candidate 305 or search candidate 310 based on a constant $k_p$ (e.g., a value for a mapping variable), where the constant corresponds to a slot of the frame. That is, the location of the CCEs corresponding to search candidate 305 or search candidate 310 in a given slot may be determined by performing calculations corresponding to a current slot ($k_p$) and a previous slot ($k_p-1$).

In some examples, $k_p$ may correspond to an absolute time. That is, search candidate 305 may have a periodicity of 5 slots and an offset of zero slots. Search candidate 305-a may be located in slot 0, search candidate 305-b may be located in slot 5, search candidate 305-c may be located in slot 10. In such examples, $k_p$ may represent the actual time of the slot including a search candidate 305 within the frame. For example, $k_p$ for slot 0 (where search candidate 305-a is located) may be equal to 0, and $k_p$ for slot 5 (where search candidate 305-b may be located) may be equal to 5, $k_p$ for slot 10 (where search candidate 305-c may be located) may be equal to 10, etc. In such cases, the calculations may be backward compatible with older devices and procedures. In some examples where $k_p$ corresponds to an absolute time, UE 115 may perform multiple iterations of the calculations. That is, the calculations of the location of search candidate 305-b within slot 5 may be iterative in nature (e.g., the location of the CCEs is based on $k_p$ and ($k_p-1$)). Thus, in order to calculate the location of the CCEs for search candidate 305-b in slot 5, UE 115 may also perform iterative calculations on the each of the five prior slots, despite the fact that there is no search candidate 305 located in any of the slots 1, 2, 3, and 4 (because calculations for the slot corresponding to $k_p$ (e.g., slot 5) are based in part on slot $k_p-1$ (e.g., slot 4), and the calculations for slot $k_p-1$ (e.g., slot 4) are based in part on slot 3, etc.).

In cases where $k_p$ corresponds to an absolute time, UE 115 may perform at least one iteration of the calculations for each slot in the frame. For example, if search candidates 305 of coreset 301 have a periodicity of 5 slots and an offset of 0 slots, then a frame containing, for example, 40 slots, may perform 40 computations to identify the CCEs corresponding to search candidate 305 in only 8 of the 40 slots. This may result in high computational complexity at UE 115. The additional computations may also result in increased power expenditures at UE 115. In some examples, instead of performing the iterative computations in real time, UE 115 may instead precompute the location of the CCEs corresponding to search candidates 305, and may store the computed values. Such precomputations may avoid real time computations and decrease computational complexity. However, precomputation may result in a greater memory requirement for UE 115.

In some examples, $k_p$ may correspond to a number of monitored slots within a frame, instead of an absolute time slot index. For instance, $k_p$ may represent a slot of a number of slots indicated via RRC signaling to carry search candidate 305 or search candidate 310. For example, if search candidate 305-a, search candidate 305-b, and search candidate 305-c are located in slots 0, 5, and 10, respectively, then $k_p$ may represent the consecutive number of monitored slots. In such cases, $k_p$ for slot 0 may be equal to 0, $k_p$ for slot 5 may be equal to 1, $k_p$ for slot 10 may be equal to 2, etc. When calculating the locations of the CCEs in a given slot, UE 115 may perform a single calculation, instead of multiple iterative calculations. That is, if search candidate 305-b is located in slot 5 (e.g., $k_p=1$), the UE may make a single calculation, because ($k_p-1$) may refer to the previous monitored slot where search candidate 305-a is located (e.g., slot 0) instead of the immediately prior slot in absolute time. In such examples, UE 115 may perform a single calculation for each slot in which a search candidate 305 is located, instead of a calculation for each slot in the frame. During a frame including, for example, 40 subframes, where search candidate 305 has a periodicity of 5 and of offset of 0 slots, UE 115 may perform only 8 calculations, instead of 40. By calculating based on monitored slots within the frame, instead of contiguous slots with respect to time, UE 115 may identify the CCEs of the search candidate of a coreset with lower computational complexity and lesser memory requirements.

In another illustrative example, $k_p$ for search candidate 310 may also correspond to a number of monitored slots within the frame, instead of an absolute time slot index. If search candidate 310-b, search candidate 310-b, and search candidate 310-c are located in slots 1, 6, and 10, respectively, then $k_p$ for search candidate 310 may still represent the consecutive number of monitored slots. That is, $k_p$ for slot 1 may be equal to 0, $k_p$ for slot 6 may be equal to 1, and $k_p$ for slot 11 may be equal to 2. In such examples, regardless of whether a CCEs corresponding to a search candidate 305 or search candidate 310 are located in a first slot, a second slot, or another slot, the $k_p$ for search candidate 305-a or 310-a may be equal to 0, $k_p$ for search candidate 305-b or 310-b may be equal to 1, $k_p$ for search candidate 305-c or 310-c may be equal to 2, etc. By calculating based on monitored slots within the frame, instead of contiguous slots with respect to time, UE 115 may identify the CCEs of the search candidate of a coreset with lower computational complexity and lesser memory requirements, regardless of the offset of the coreset.

Figure 4:
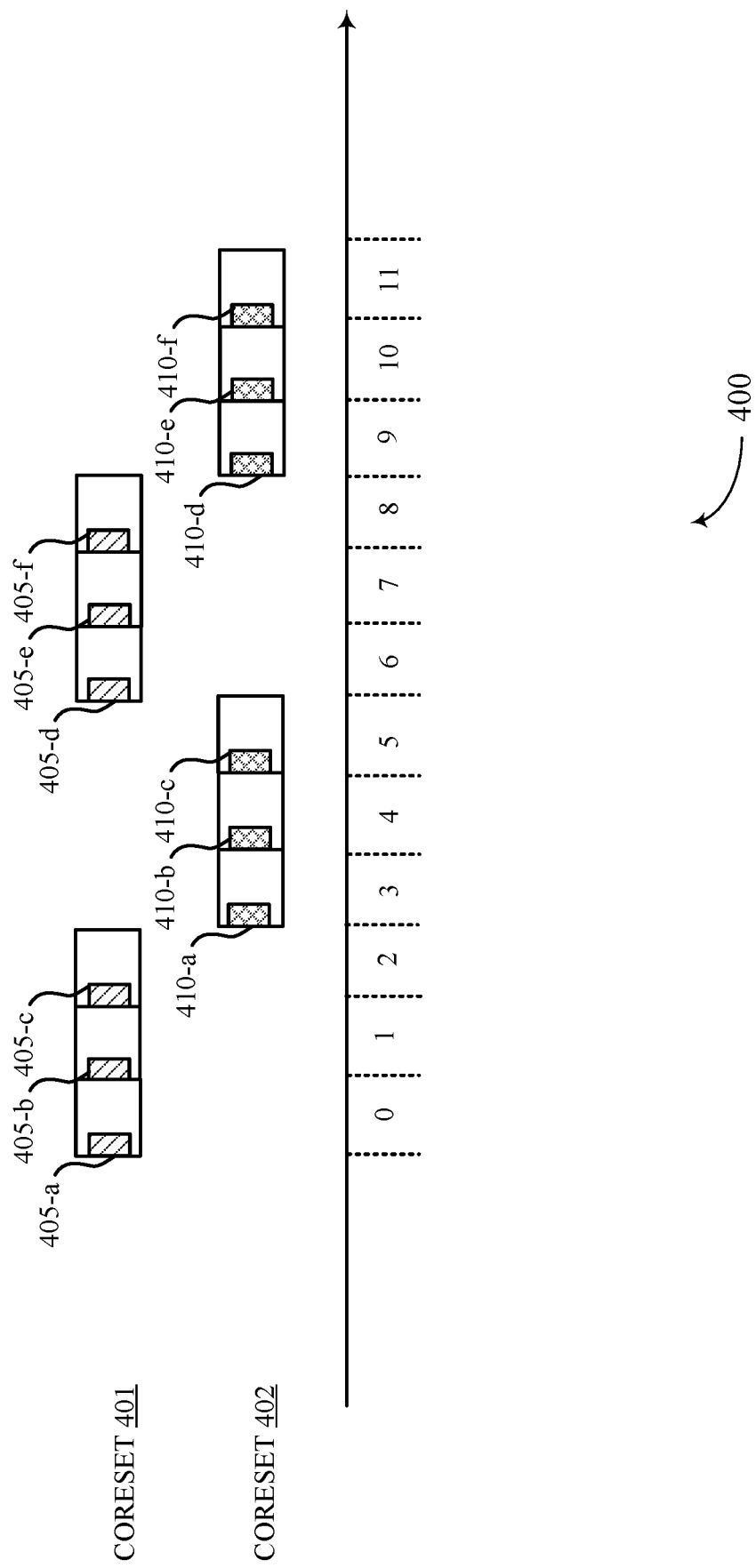
FIG. 4 illustrates an example of a timeline that supports control channel mapping within search space for wireless systems in accordance with aspects of the present disclosure.

FIG. 4 illustrates an example of a timeline 400 that supports control channel mapping within search space for wireless systems in accordance with various aspects of the present disclosure. In some examples, timeline 400 may implement aspects of wireless communication system 100. A UE 115 and a base station 105, which may be examples of corresponding devices as described with reference to wireless communications systems 100 and 200, may execute techniques used in timeline 400.

In some examples of wireless communications system 100 or 200, a base station 105 may communicate with a UE 115, and may send control transmissions such as DCI via a PDCCH. UE 115 may be configured to monitor a PDCCH within a search space, which may include multiple search candidates. In some cases, search candidates may be referred to alternatively or additionally as control channel candidates, or PDCCH candidates. That is, each search space may include multiple CCEs, and may include one or more search candidates, each of which may include one or more CCEs. UE 115 may be configured to monitor one or more search candidates in the search space, and may blindly decode the one or more CCEs of the search candidate to receive control information.

In some examples (e.g., a mmW system), control information such as DCI may be included in a coreset. The coreset 401 or coreset 402 may include multiple resource blocks in the frequency domain, and may include n OFDM symbols in the time domain (where n is an integer). The coreset may include a total set of resources allocated for control information. In some examples, the coreset may include one or more CCEs corresponding to a particular search candidate in one or more slots of a frame. For example, a frame with a 120 kHz numerology may have a total of 80 slots. The slots including CCEs of search candidate 405 or search candidate 410 may or may not be contiguous, and may be indicated via higher layer signaling (e.g., radio resource control (RRC) signaling). In some examples, a search candidate 405 may be identified by a periodicity, a monitoring window of a number of contiguous slots, and an offset, which may be the same or different than a periodicity, monitoring window, and offset for search candidate 410.

For example, search candidate 405 may have a periodicity of 6 slots, a monitoring window of 3 contiguous slots, and an offset of 0 slots. In such examples, search candidate 405-a may be located in slot 0, search candidate 405-b may be located in slot 1, search candidate 405-c may be located in slot 2, search candidate 405-d may be located in slot 6, search candidate 405-e may be located in slot 7, and search candidate 405-f may be located in slot 8, etc. Search candidate 410 may have a periodicity of 6 slots, a monitoring window of 3 slots, and an offset of 3 slots. In such examples, search candidate 410-a may be located in slot 3, search candidate 410-b may be located in slot 4, search candidate 410-c may be located in slot 5, search candidate 410-d may be located in slot 9, search candidate 410-e may be located in slot 10, and search candidate 410-f may be located in slot 11, etc.

In some examples, as discussed in greater detail in FIG. 3, UE 115 may monitor search spaces of the identified slots for one of search candidate 405 or 410. UE 115 may identify the location of the CCEs for a search candidate 405 or 410 based on one or more calculations, which may be based on a current slot and a previous slot. In some examples, UE 115 may perform the calculations and may identify the CCEs of search candidate 405 or search candidate 410 based on a constant $k_p$ (e.g., a value for a mapping variable), where the constant $k_p$ corresponds to a slot of the frame. That is, the location of the CCEs corresponding to search candidate 405 or search candidate 410 in a given slot may be determined by performing calculations based on a current slot ($k_p$) and a previous slot ($k_p-1$).

In some examples, $k_p$ may correspond to an absolute time within a TTI. For example, $k_p$ may correspond to an absolute time within an NR frame. That is, for search candidate 405 or search candidate 410, $k_p$ may represent the actual time of the slot including a search candidate 405 or 410 within the frame. For example, $k_p$ for slot 0 (where search candidate 405-a is located) may be equal to 0, $k_p$ for slot 1 (where search candidate 405-b may be located) may be equal to 1, $k_p$ for slot 2 (where search candidate 405-c may be located) may be equal to 2, and $k_p$ for slot 6 (where search candidate 405-d may be located) may be equal to 6, etc. Similarly, for search candidate 410, $k_p$ for slot 3 (where search candidate 410-a is located) may be equal to 3, $k_p$ for slot 4 (where search candidate 410-b may be located) may be equal to 4, $k_p$ for slot 5 (where search candidate 410-c may be located) may be equal to 5, and $k_p$ for slot 9 (where search candidate 410-d may be located) may be equal to 9, etc. In such cases, the calculations may be backward compatible with older devices and procedures. In some examples where $k_p$ corresponds to an absolute time, UE 115 may perform multiple iterations of the calculations. That is, the calculations of the location of search candidate 410-d within slot 9 may be iterative in nature (e.g., the location of the CCEs is based on $k_p$ and $(k_p-1)$). Thus, in order to calculate the location of the CCEs for search candidate 410-d in slot 9, UE 115 may also perform iterative calculations on each of the slots 5 (where search candidate 410-c is located) and slots 6, 7, and 8 (where no CCEs for search candidate 410 are located). The iterative calculations may be performed because calculations for the slot corresponding to $k_p$ (e.g., slot 9) are based in part on slot $k_p-1$ (e.g., slot 8), and the calculations for slot $k_p-1$ (e.g., slot 8) are based in part on slot 7, etc. As discussed with respect to FIG. 3, utilizing a $k_p$ that corresponds to an absolute time may be backward compatible with older devices, but may result in increased computational complexity and increased memory requirements at UE 115.

In some examples, $k_p$ may correspond to a number of monitored slots within a frame, instead of an absolute time slot index. That is, $k_p$ may represent a slot of a number of slots indicated via RRC signaling to carry search candidate 405 or search candidate 410. For example, $k_p$ may represent a consecutive number of monitored slots. In such cases, $k_p$ for slot 0 (where search candidate 405-a is located) may be equal to 0, $k_p$ for slot 1 (where search candidate 405-b is located) may be equal to 1, $k_p$ for slot 2 (where search candidate 405-c is located) may be equal to 2, and $k_p$ for slot 6 (where search candidate 405-d is located 0 may be equal to 3, etc. When calculating the locations of the CCEs of a search candidate in a given slot, UE 115 may perform a single calculation instead of multiple iterative calculations. That is, if search candidate 405-d is located in slot 6 (e.g., $k_p=3$), the UE may make a single calculation, because $(k_p-1)$ may refer to the previous monitored slot where search candidate 405-c is located (e.g., slot 2), instead of the immediately prior slot in absolute time (e.g., slot 5). In such examples, UE 115 may perform a single calculation for each slot in which a search candidate 405 is located, instead of a calculation for each slot in the frame. By calculating the location of CCEs of a search candidate based on monitored slots within the frame, instead of each contiguous slots of the frame, UE 115 may identify the CCEs of the search candidate of a coreset 401 or coreset 402 with lower computational complexity and lesser memory requirements.

Figure 5:
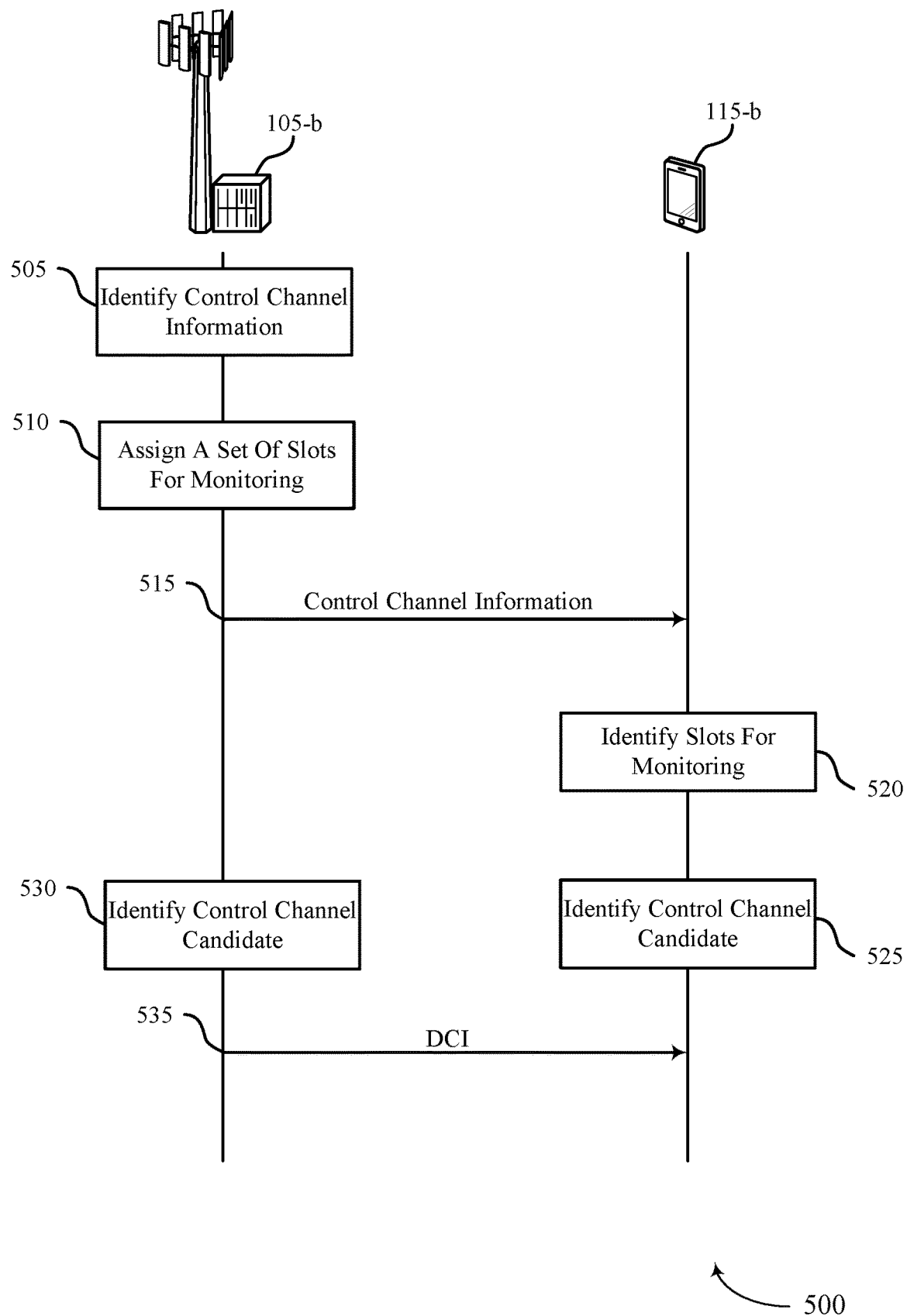
FIG. 5 illustrates an example of a process flow that supports control channel mapping within search space for wireless systems in accordance with aspects of the present disclosure.

FIG. 5 illustrates an example of a process flow 500 that supports control channel mapping within search space for wireless systems in accordance with various aspects of the present disclosure. In some examples, process flow 500 may implement aspects of wireless communication system 100.

Base station 105-*b* and UE 115-*b* in process flow 500 may perform techniques executed by a UE 115-*b* and a base station 105-*b*, which may be examples of corresponding devices as described with reference to wireless communications systems 100, and 200.

At 505, base station 105-*b* may identify control channel information. In some examples, base station 105-*b* may identify a control channel monitoring periodicity and control channel offset for UE 115-*b*.

At 510, base station 105-*b* may assign a set of slots within a radio frame for monitoring by UE 115-*b* based on the control channel monitoring periodicity and the control channel offset identified at 505.

At 515, base station 105-*b* may transmit control channel information to UE 115-*b* in a downlink message. For example, the downlink message may indicate a control channel monitoring periodicity and a control channel offset for a radio frame, which may be identified at 505.

In some examples, the control channel information received at 515 may include a monitoring window that identifies a number of slots UE 115-*b* may monitor. In some examples, UE 115-*b* may determine groups of multiple consecutive slots for monitoring within the radio frame based on the monitoring window, the control channel monitoring periodicity, and the control channel offset. For example, UE 115-*b* may determine that the CCEs of a search space for a coreset have an offset of 0, a periodicity of 6, and a monitoring window of 3. In such cases, the UE may monitor slots 0, 1, and 2, and slots 6, 7, and 8, etc.

In some examples, the downlink message may also include an indication of a modulo operation for a time monitoring window variable, and the control channel candidate is determined based on the modulo operation. In some examples the time monitoring window variable $k_p$ may indicate a slot index within the radio frame.

At 520, UE 115-*b* may identify slots within the radio frame for monitoring. In some examples, the identifying may be based on the control channel monitoring periodicity and the control channel offset received at 515.

At 525, UE 115-*b* may identify a control channel candidate (e.g., a search candidate or a PDCCH candidate) within a search space of each slot of the set of slots. In some cases, the UE 115-*b* may identify the control channel candidate for a first slot based on a second slot. For example, the control channel candidate for a first slot represented by $k_p$ may be based on $k_p-1$, where $k_p$ and $k_p-1$ are integers representing a slot timing or a slot index value. In some cases, one or more slots may occur between the first slot $k_p$ and the second (previous) slot $k_p-1$. For example, $k_p$ may be a current slot (e.g., slot 5), and $k_p-1$ may be a previous but non-consecutive slot (e.g., slot 0).

In some examples, UE 115-*b* may determine a value (e.g., $k_p$) for a mapping variable (e.g., $k_p$) for the first slot based on the value of the mapping variable for the second slot. The value of the second slot may be represented by $k_p-1$.

In some examples, UE 115-*b* may identify or determine a CCE index for a first CCE of a set of CCEs within the search space. UE 115-*b* may determine the CCE index by performing calculations based on a current slot and a previous slot, the result of the calculations providing the CCE index.

At 530, base station 105-*b* may identify a control channel candidate within a search space of each slot of the set of slots assigned at 510. In some examples, base station 105-*b* may identify the control channel candidate for a first slot based on a second slot, and one or more slots may occur between the first slot and the second slot. Base station 105-*b* may determine a value for a mapping variable (e.g., $k_p$) for a mapping variable for the first slot based on the value of the mapping variable for the second slot $k_p-1$. In some examples base station 105-*b* may identify groups of multiple consecutive slots to monitor within the radio frame based on the monitoring window, the control channel monitoring periodicity, and the control channel offset. Identifying the control channel candidate may also include determining a CCE index for a first CCE of a set of CCEs within the search space.

At 535, base station 105-*b* may transmit, and UE 115-*b* may receive, DCI for UE 115-*b*. The DCI may be received by UE 115-*b* based on the control channel candidate identified at 525. For example, UE 115-*b* may monitor a set of PDCCH candidates within the search space based on the control channel candidate. UE 115-*b* may receive a PDCCH payload that is UE-specific, based on the monitoring.

Figure 6:
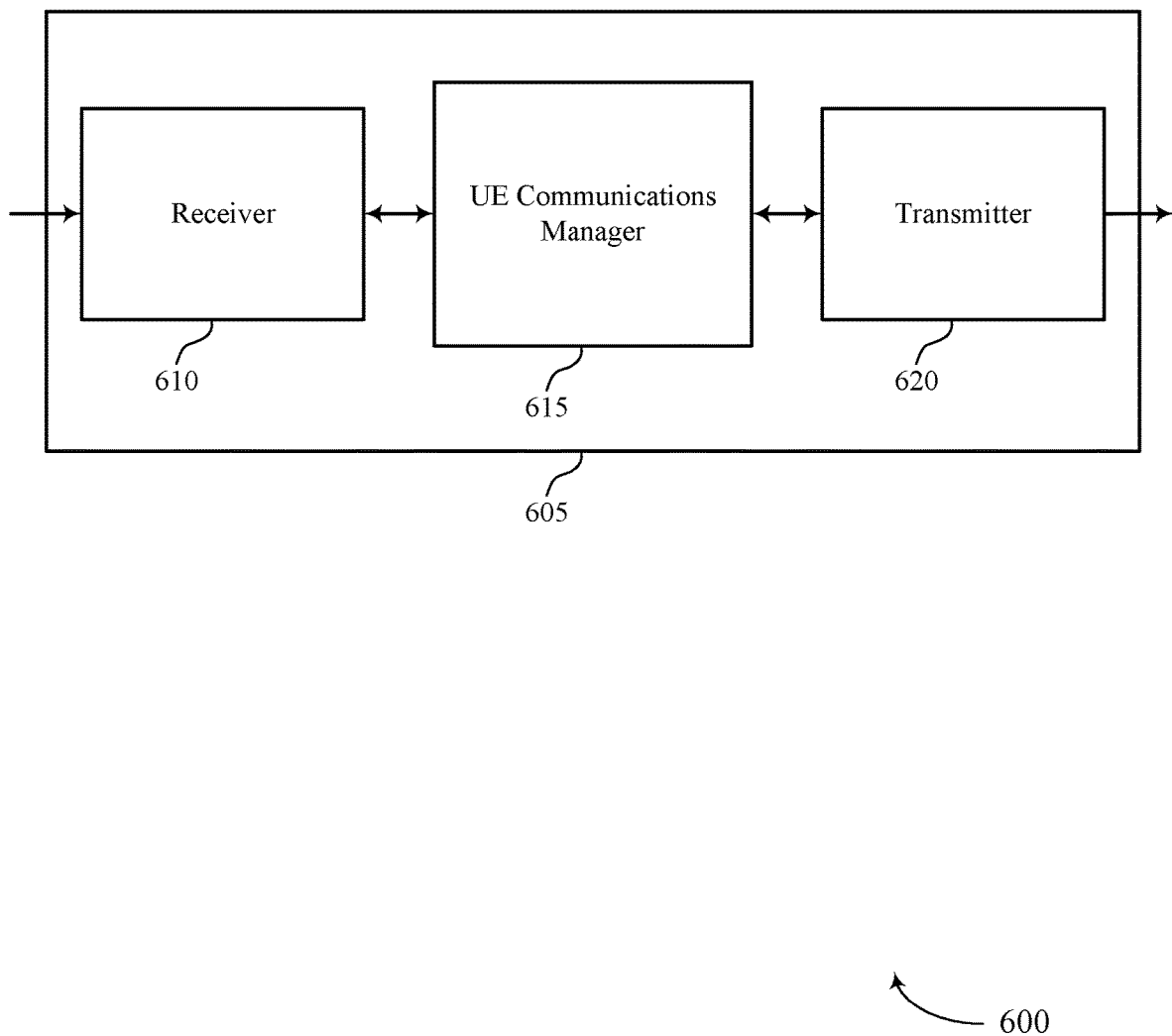
FIGS. 6 through 8 show block diagrams of a device that supports control channel mapping within search space for wireless systems in accordance with aspects of the present disclosure.

FIG. 6 shows a block diagram 600 of a wireless device 605 that supports control channel mapping within search space for wireless systems in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to control channel mapping within search space for wireless systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a downlink message from a base station that indicates a control channel monitoring periodicity and a control channel offset for a radio frame, and may identify based on the control channel monitoring periodicity and the control channel offset, a set of slots within the radio frame for monitoring by a UE. UE communications manager 615 may further identify a control channel candidate within a search space of each slot of the set of slots, where the control channel candidate for a first slot is identified based on a second slot, and where one or more slots occur between the first slot and the second slot, and may receive DCI for the UE based on the control channel candidate.

The UE communications manager 615 may also receive a downlink message from a base station in a mmW communications system that indicates a control channel monitoring periodicity and a control channel offset for a radio frame, and may identify, based on the control channel monitoring periodicity and the control channel offset, a set of slots within the radio frame for monitoring by a UE, may identify a control channel candidate within a search space of each slot of the set of slots, where the control channel candidate for a first slot is identified based on a second slot, and receive DCI for the UE via a mmW control channel based on the control channel candidate.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
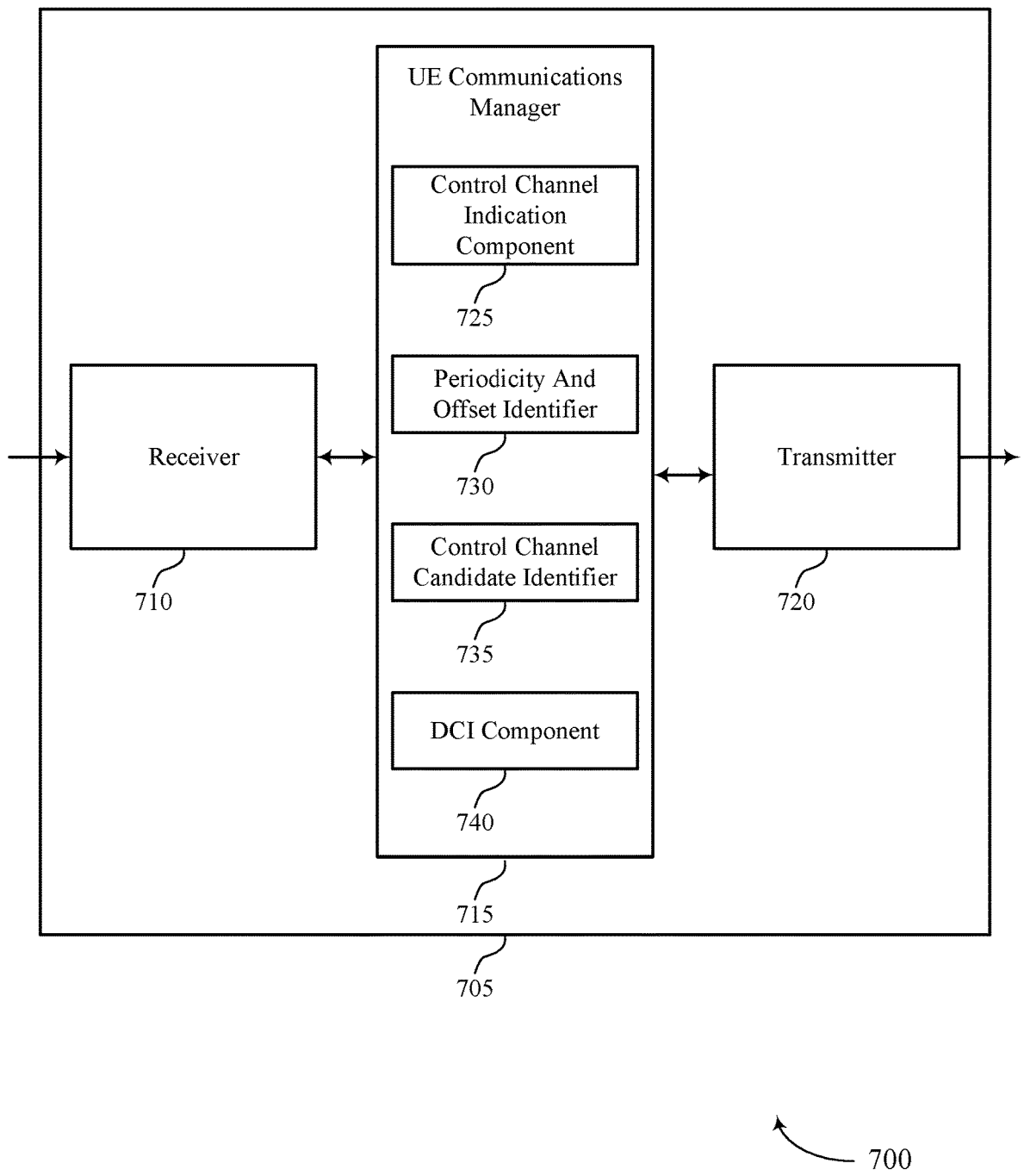

FIG. 7 shows a block diagram 700 of a wireless device 705 that supports control channel mapping within search space for wireless systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to control channel mapping within search space for wireless systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include control channel indication component 725, periodicity and offset identifier 730, control channel candidate identifier 735, and DCI component 740.

Control channel indication component 725 may receive, from a base station, a downlink message that indicates a control channel monitoring periodicity and a control channel offset for a radio frame and receive, from a base station in a mmW communications system, a downlink message that indicates a control channel monitoring periodicity and a control channel offset for a radio frame. Control channel indication component 725 may identify, based on the control channel monitoring periodicity and the control channel offset, a set of slots within the radio frame for monitoring by a UE.

Periodicity and offset identifier 730 may identify, based on the control channel monitoring periodicity and the control channel offset, a set of slots within the radio frame for monitoring by a UE.

Control channel candidate identifier 735 may identify a control channel candidate within a search space of each slot of the set of slots, where the control channel candidate for a first slot is identified based on a second slot, and where one or more slots occur between the first slot and the second slot. Control channel candidate identifier 735 may receive DCI for the UE based on the control channel candidate and identify a control channel candidate within a search space of each slot of the set of slots, where the control channel candidate for a first slot is identified based on a second slot. In some cases, identifying the control channel candidate includes determining a CCE index for a first CCE of a set of CCEs within the search space. In some examples, identifying the control channel candidate includes determining a value for a mapping variable for the first slot based on the value of the mapping variable for the second slot, where the first and second slots are consecutive.

DCI component 740 may receive, via a mmW control channel, DCI for the UE based on the control channel candidate.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
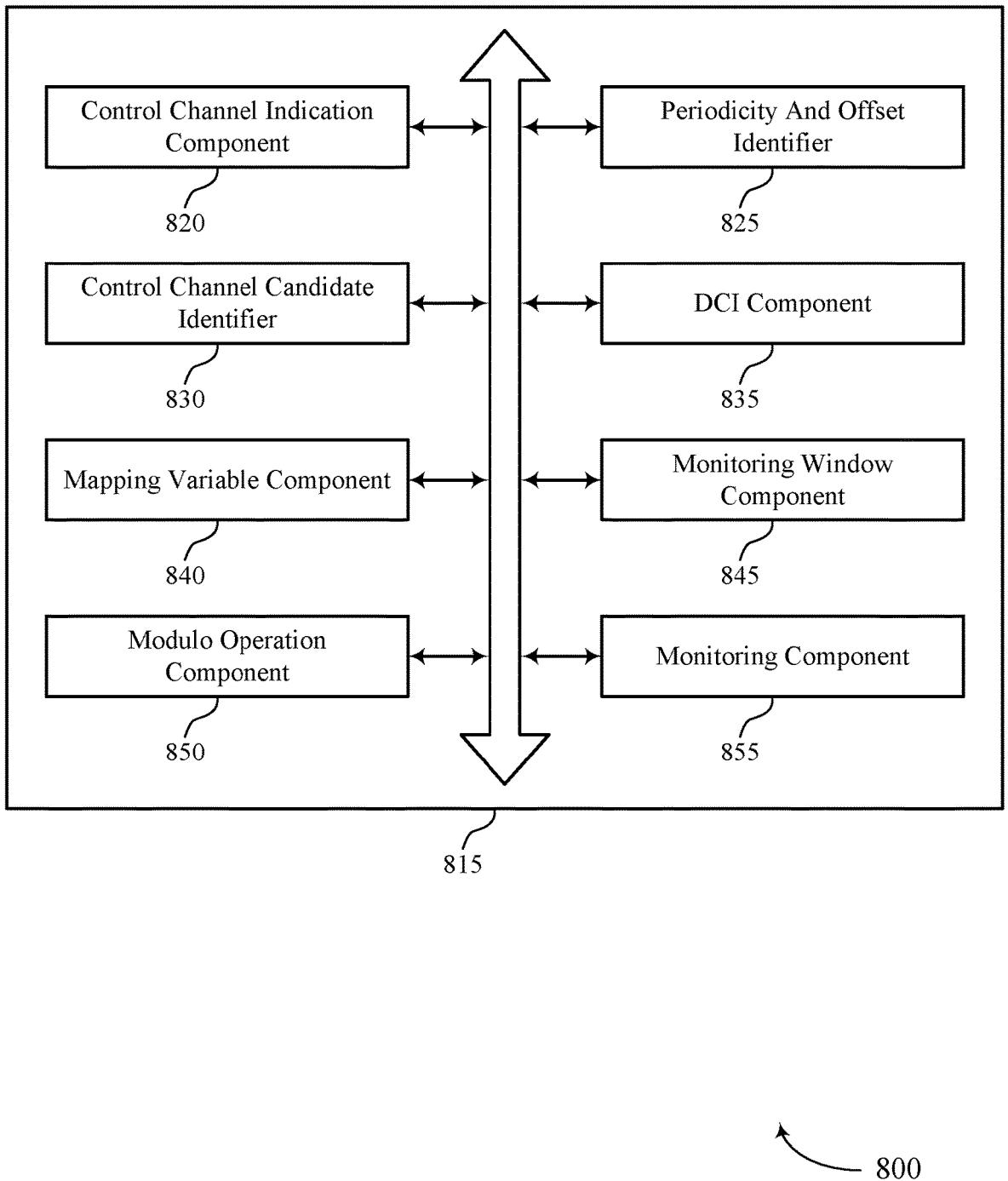

FIG. 8 shows a block diagram 800 of a UE communications manager 815 that supports control channel mapping within search space for wireless systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include control channel indication component 820, periodicity and offset identifier 825, control channel candidate identifier 830, DCI component 835, mapping variable component 840, monitoring window component 845, modulo operation component 850, and monitoring component 855. Each of these modules may communicate directly or indirectly with one another (e.g., via one or more buses).

Control channel indication component 820 may receive, from a base station, a downlink message that indicates a control channel monitoring periodicity and a control channel offset for a radio frame and receive, from a base station in a mmW communications system, a downlink message that indicates a control channel monitoring periodicity and a control channel offset for a radio frame. Control channel indication component 820 may identify, based on the control channel monitoring periodicity and the control channel offset, a set of slots within the radio frame for monitoring by a UE.

Periodicity and offset identifier 825 may identify, based on the control channel monitoring periodicity and the control channel offset, a set of slots within the radio frame for monitoring by a UE.

Control channel candidate identifier 830 may identify a control channel candidate within a search space of each slot of the set of slots, where the control channel candidate for a first slot is identified based on a second slot, and where one or more slots occur between the first slot and the second slot. Control channel candidate identifier 830 may receive DCI for the UE based on the control channel candidate, and identify a control channel candidate within a search space of each slot of the set of slots, where the control channel candidate for a first slot is identified based on a second slot. In some cases, identifying the control channel candidate includes determining a CCE index for a first CCE of a set of CCEs within the search space. In some examples, identifying the control channel candidate includes determining a value for a mapping variable for the first slot based on the value of the mapping variable for the second slot, where the first and second slots are consecutive.

DCI component 835 may receive, via a mmW control channel, DCI for the UE based on the control channel candidate.

Mapping variable component 840 may determine a value for a mapping variable for the first slot based on the value of the mapping variable for the second slot. In some cases, the time duration variable indicates a slot index within the radio frame.

Monitoring window component 845 may determine groups of multiple consecutive slots to monitor within the radio frame based on the monitoring window, the control channel monitoring periodicity, and the control channel offset. In some cases, the downlink message includes an indication of a monitoring window that identifies a number of slots for monitoring by the UE.

Modulo operation component 850 may transmit, as a part of the downlink message, an indication of a modulo operation for a time duration variable, where the control channel candidate is determined based on the modulo operation.

Monitoring component 855 may receive a PDCCH payload for the UE based on the monitoring. In some cases, receiving DCI includes monitoring a set of PDCCH candidates within the search space based on the control channel candidate.

Figure 9:
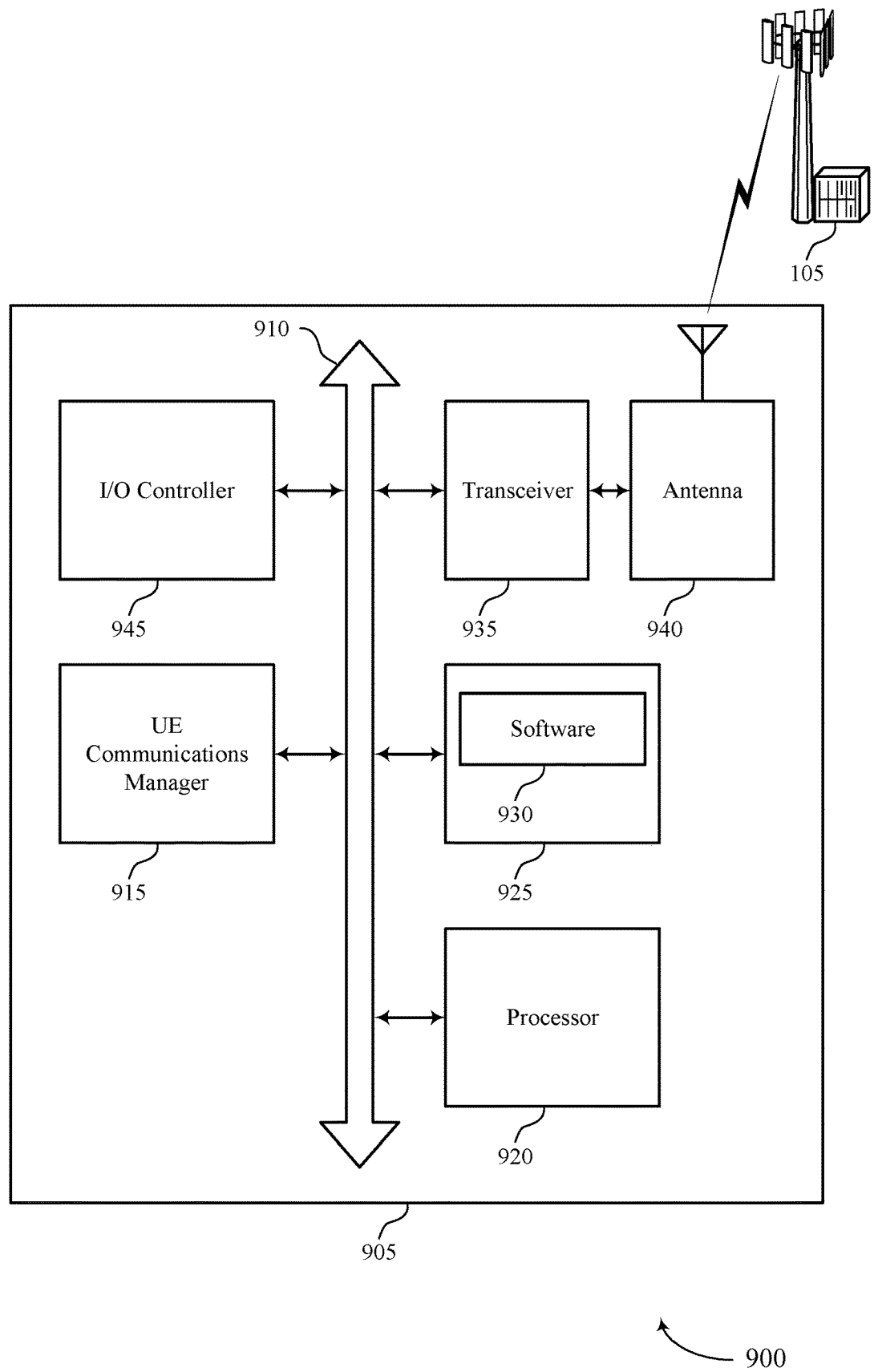
FIG. 9 illustrates a block diagram of a system including a user equipment (UE) that supports control channel mapping within search space for wireless systems in accordance with aspects of the present disclosure.

FIG. 9 shows a diagram of a system 900 including a device 905 that supports control channel mapping within search space for wireless systems in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting control channel mapping within search space for wireless systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support control channel mapping within search space for wireless systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
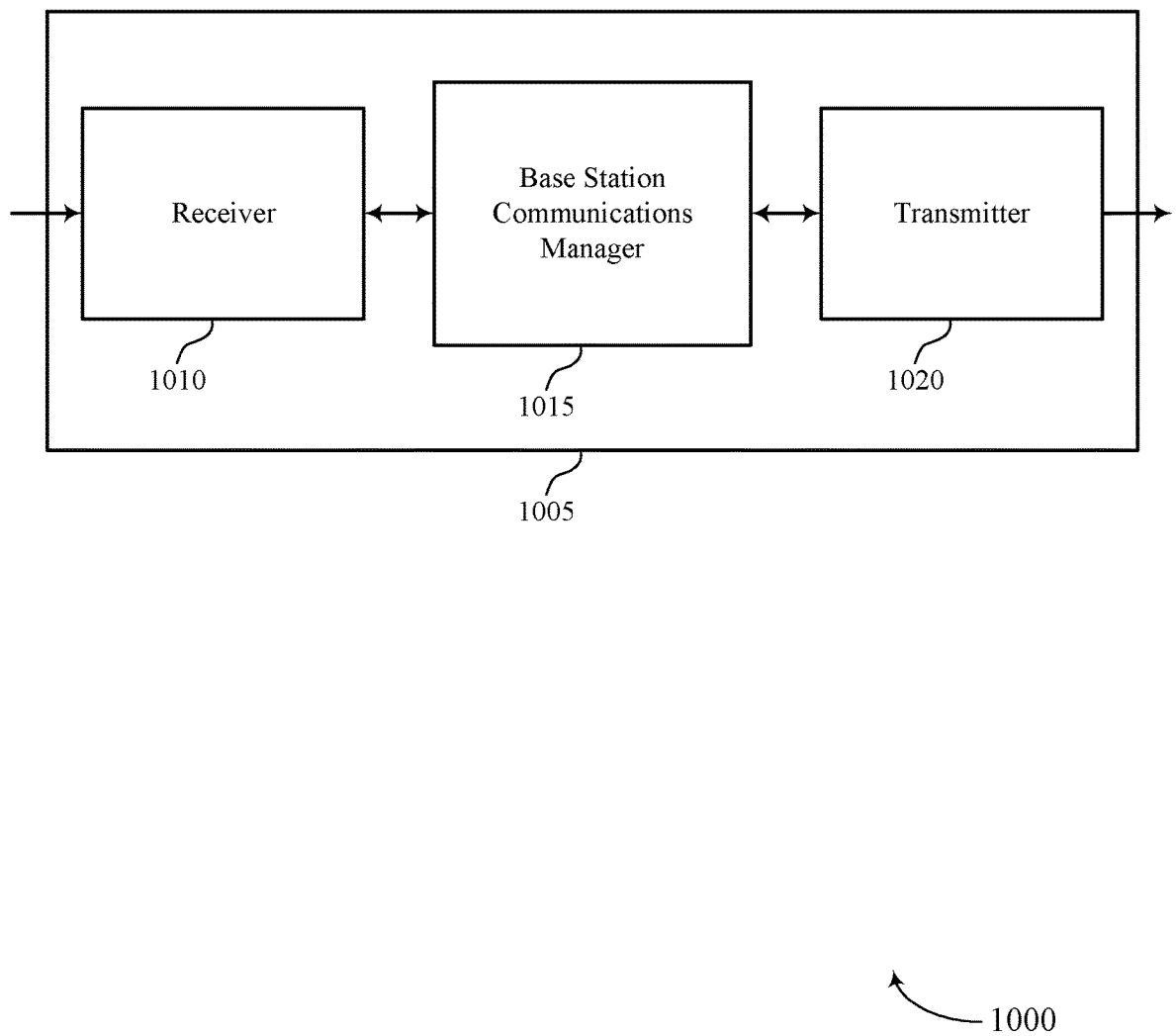
FIGS. 10 through 12 show block diagrams of a device that supports control channel mapping within search space for wireless systems in accordance with aspects of the present disclosure.

FIG. 10 shows a block diagram 1000 of a wireless device 1005 that supports control channel mapping within search space for wireless systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to control channel mapping within search space for wireless systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a control channel monitoring periodicity and a control channel offset for a UE, and may assign based on the control channel monitoring periodicity and the control channel offset, a set of slots within a radio frame for monitoring by the UE. Base station communications manager 1015 may further identify a control channel candidate within a search space of each slot of the set of slots, where the control channel candidate for a first slot is identified based on a second slot, and where one or more slots occur between the first slot and the second slot, and may transmit DCI for the UE based on the control channel candidate.

The base station communications manager 1015 may also identify a control channel monitoring periodicity and a control channel offset for a UE in a mmW communications system, assign, based on the control channel monitoring periodicity and the control channel offset, a set of slots within a radio frame for monitoring by the UE, identify a control channel candidate within a search space of each slot of the set of slots, where the control channel candidate for a first slot is identified based on a second slot, and transmit, via a mmW control channel, DCI for the UE based on the control channel candidate.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
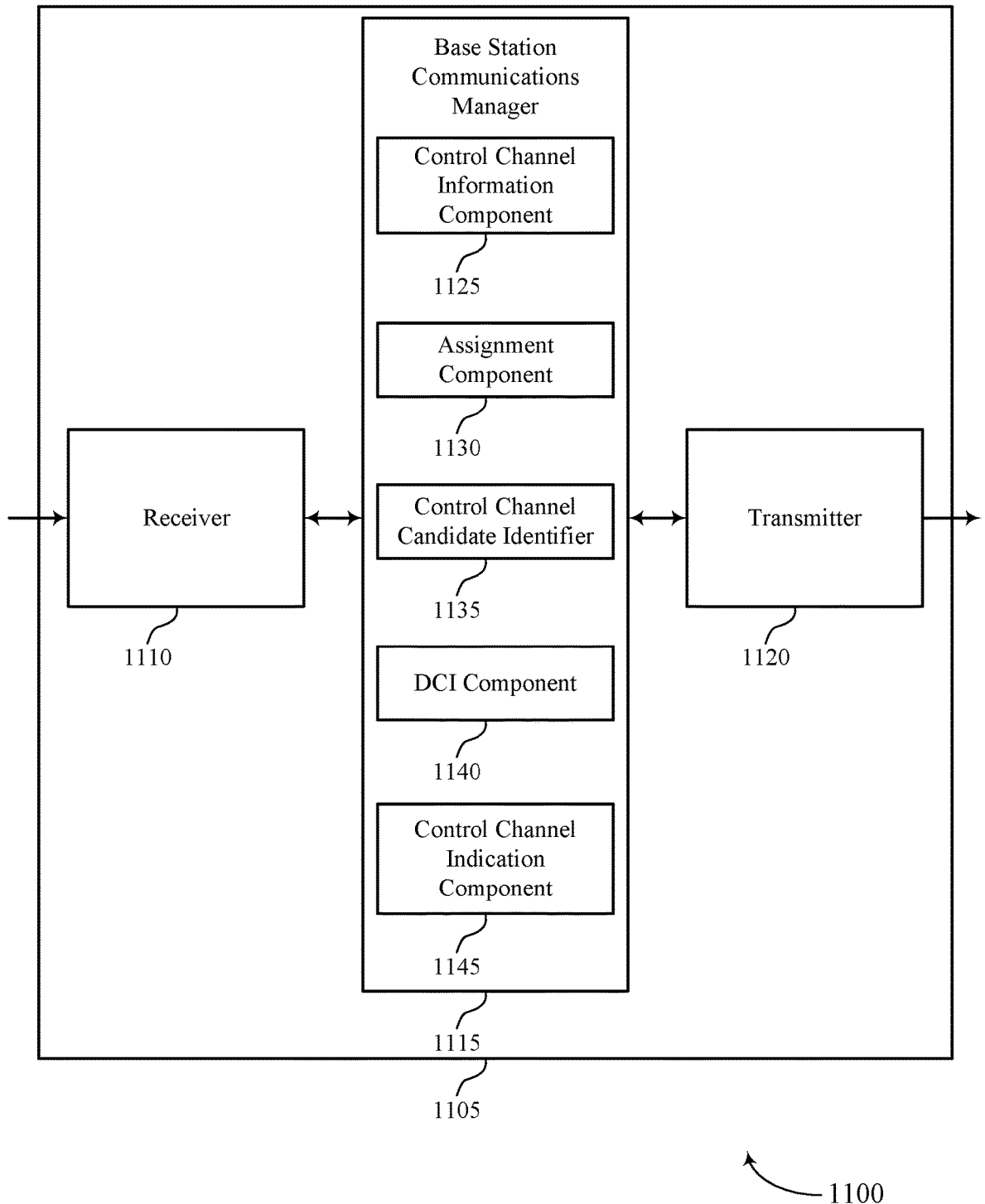

FIG. 11 shows a block diagram 1100 of a wireless device 1105 that supports control channel mapping within search space for wireless systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to control channel mapping within search space for wireless systems, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include control channel information component 1125, assignment component 1130, control channel candidate identifier 1135, DCI component 1140, and control channel indication component 1145.

Control channel information component 1125 may identify a control channel monitoring periodicity and a control channel offset for a UE. Assignment component 1130 may assign, based on the control channel monitoring periodicity and the control channel offset, a set of slots within a radio frame for monitoring by the UE.

Control channel candidate identifier 1135 may identify a control channel candidate within a search space of each slot of the set of slots, where the control channel candidate for a first slot is identified based on a second slot, and where one or more slots occur between the first slot and the second slot. Control channel candidate identifier 1135 may identify a control channel candidate within a search space of each slot of the set of slots, where the control channel candidate for a first slot is identified based on a second slot. In some cases, identifying the control channel candidate includes determining a value for a mapping variable for the first slot based on the value of the mapping variable for the second slot. In some examples, identifying the control channel candidate includes determining a CCE index for a first CCE of a set of CCEs within the search space. In some aspects, identifying the control channel candidate includes determining a value for a mapping variable for the first slot based on the value of the mapping variable for the second slot, where the first and second slots are consecutive.

DCI component 1140 may transmit DCI for the UE based on the control channel candidate and transmit, via a mmW control channel, DCI for the UE based on the control channel candidate. In some cases, transmitting DCI includes transmitting a PDCCH payload for the UE.

Control channel indication component 1145 may transmit a downlink message that indicates the control channel monitoring periodicity and the control channel offset and identify a control channel monitoring periodicity and a control channel offset for a UE in a mmW communications system.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
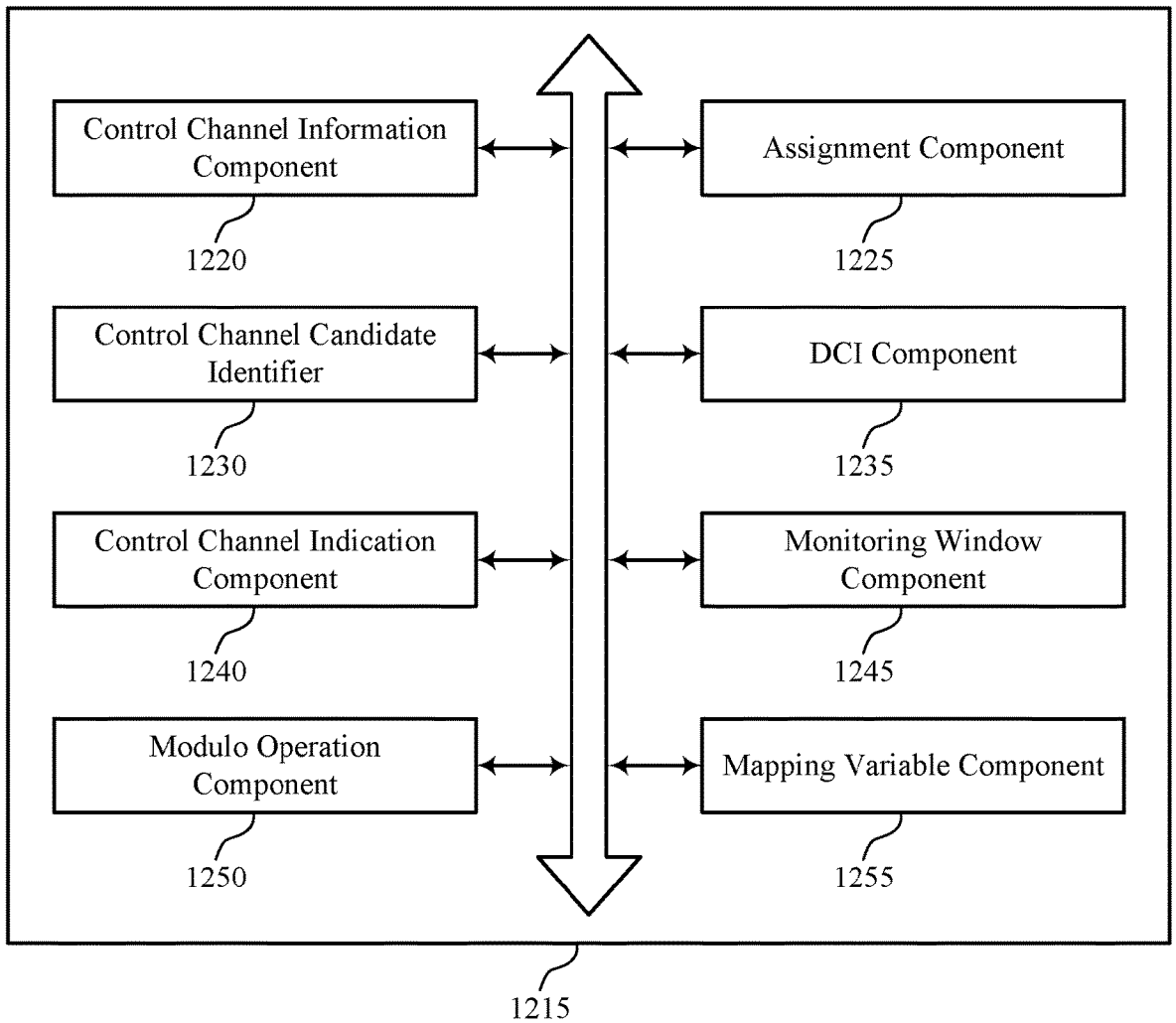

FIG. 12 shows a block diagram 1200 of a base station communications manager 1215 that supports control channel mapping within search space for wireless systems in accordance with aspects of the present disclosure. The base station communications manager 1215 may be an example of aspects of a base station communications manager 1315 described with reference to FIGS. 10, 11, and 13. The base station communications manager 1215 may include control channel information component 1220, assignment component 1225, control channel candidate identifier 1230, DCI component 1235, control channel indication component 1240, monitoring window component 1245, modulo operation component 1250, and mapping variable component 1255. Each of these modules may communicate, directly or indirectly, with one another (e.g., via one or more buses).

Control channel information component 1220 may identify a control channel monitoring periodicity and a control channel offset for a UE. Assignment component 1225 may assign, based on the control channel monitoring periodicity and the control channel offset, a set of slots within a radio frame for monitoring by the UE.

Control channel candidate identifier 1230 may identify a control channel candidate within a search space of each slot of the set of slots, where the control channel candidate for a first slot is identified based on a second slot, and where one or more slots occur between the first slot and the second slot. Control channel candidate identifier 1230 may identify a control channel candidate within a search space of each slot of the set of slots, where the control channel candidate for a first slot is identified based on a second slot. In some cases, identifying the control channel candidate includes determining a value for a mapping variable for the first slot based on the value of the mapping variable for the second slot. In some examples, identifying the control channel candidate includes determining a CCE index for a first CCE of a set of CCEs within the search space. In some aspects, identifying the control channel candidate includes determining a value for a mapping variable for the first slot based on the value of the mapping variable for the second slot, where the first and second slots are consecutive.

DCI component 1235 may transmit DCI for the UE based on the control channel candidate and transmit, via a mmW control channel, DCI for the UE based on the control channel candidate. In some cases, transmitting DCI includes transmitting a PDCCH payload for the UE.

Control channel indication component 1240 may transmit a downlink message that indicates the control channel monitoring periodicity and the control channel offset and identify a control channel monitoring periodicity and a control channel offset for a UE in a mmW communications system.

Monitoring window component 1245 may identify groups of multiple consecutive slots for monitoring within the radio frame based on the monitoring window, the control channel monitoring periodicity, and the control channel offset. In some cases, the downlink message includes an indication of a monitoring window that identifies a number of slots for monitoring by the UE.

Modulo operation component 1250 may transmit, as part of the downlink message, an indication of a modulo operation for a time duration variable, where the control channel candidate is identified based on the modulo operation.

Mapping variable component 1255 may generate a time duration variable that indicates a slot index within the radio frame.

Figure 13:
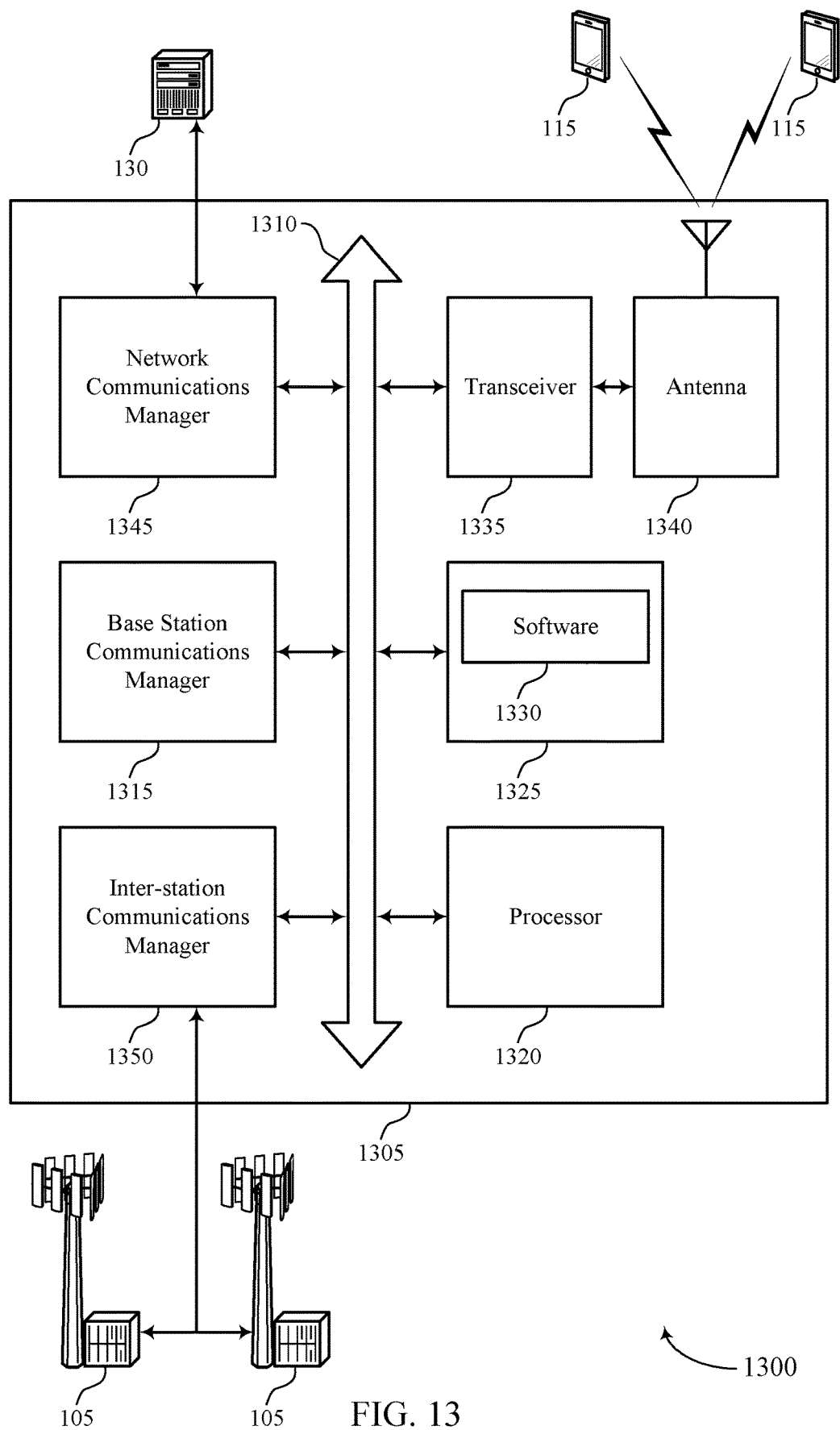
FIG. 13 illustrates a block diagram of a system including a base station that supports control channel mapping within search space for wireless systems in accordance with aspects of the present disclosure.

FIG. 13 shows a diagram of a system 1300 including a device 1305 that supports control channel mapping within search space for wireless systems in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting control channel mapping within search space for wireless systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support control channel mapping within search space for wireless systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
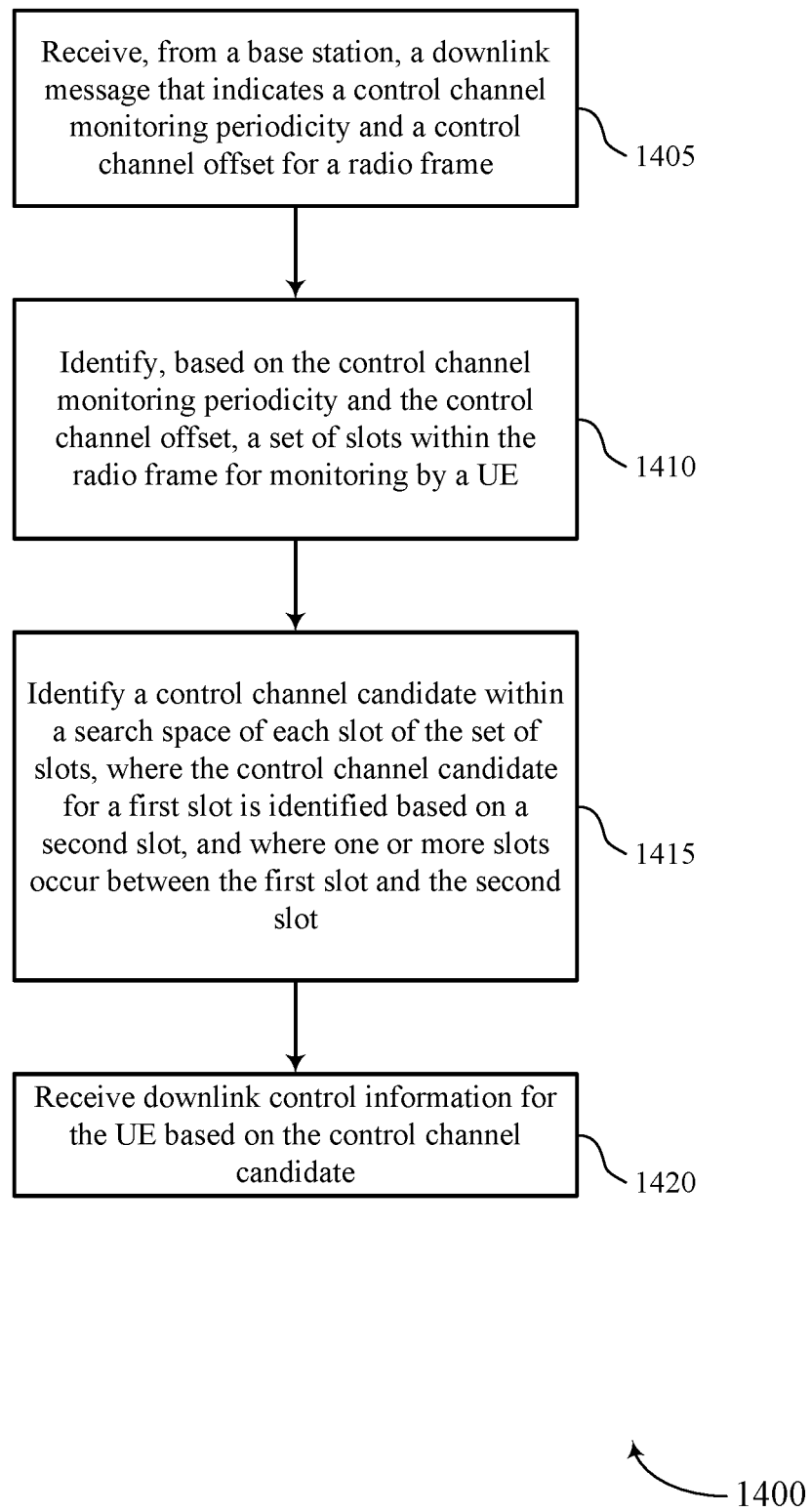
FIGS. 14 through 19 illustrate methods for control channel mapping within search space for wireless systems in accordance with aspects of the present disclosure.

FIG. 14 shows a flowchart illustrating a method 1400 for control channel mapping within search space for wireless systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may receive, from a base station, a downlink message that indicates a control channel monitoring periodicity and a control channel offset for a radio frame. The operations of 1405 may be performed according to the methods described herein. In certain examples, aspects of the operations of 1405 may be performed by a control channel indication component as described with reference to FIGS. 6 through 9.

At 1410 the UE 115 may identify, based on the control channel monitoring periodicity and the control channel offset, a set of slots within the radio frame for monitoring by a UE. The operations of 1410 may be performed according to the methods described herein. In certain examples, aspects of the operations of 1410 may be performed by a periodicity and offset identifier as described with reference to FIGS. 6 through 9.

At 1415 the UE 115 may identify a control channel candidate within a search space of each slot of the set of slots, where the control channel candidate for a first slot is identified based on a second slot, and where one or more slots occur between the first slot and the second slot. The operations of 1415 may be performed according to the methods described herein. In certain examples, aspects of the operations of 1415 may be performed by a control channel candidate identifier as described with reference to FIGS. 6 through 9.

At 1420 the UE 115 may receive DCI for the UE based on the control channel candidate. The operations of 1420 may be performed according to the methods described herein. In certain examples, aspects of the operations of 1420 may be performed by a control channel candidate identifier as described with reference to FIGS. 6 through 9.

Figure 15:
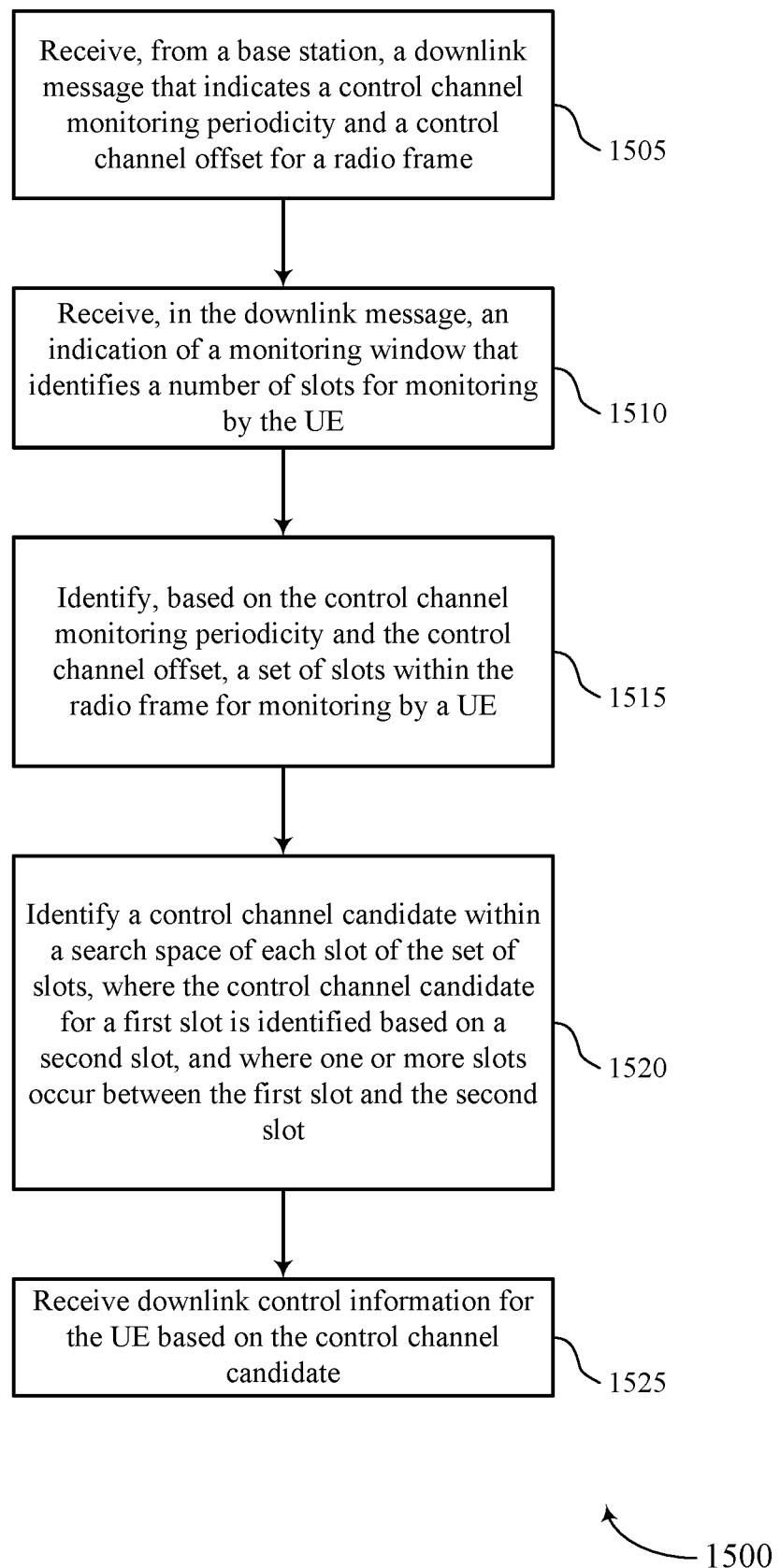

FIG. 15 shows a flowchart illustrating a method 1500 for control channel mapping within search space for wireless systems in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive a downlink message from a base station indicating a control channel monitoring periodicity and a control channel offset for a radio frame. The operations of 1505 may be performed according to the methods described herein. In certain examples, aspects of the operations of 1505 may be performed by a control channel indication component as described with reference to FIGS. 6 through 9.

At 1510 the UE 115 may receive, in the downlink message, an indication of a monitoring window that identifies a number of slots for monitoring by the UE. The operations of 1510 may be performed according to the methods described herein. In certain examples, aspects of the operations of 1510 may be performed by a monitoring window component as described with reference to FIGS. 6 through 9.

At 1515 the UE 115 may identify, based on the control channel monitoring periodicity and the control channel offset, a set of slots within the radio frame for monitoring. The operations of 1515 may be performed according to the methods described herein. In certain examples, aspects of the operations of 1515 may be performed by a periodicity and offset identifier as described with reference to FIGS. 6 through 9.

At 1520 the UE 115 may identify a control channel candidate within a search space of each slot of the set of slots, where the control channel candidate for a first slot is identified based on a second slot, and where one or more slots occur between the first slot and the second slot. The operations of 1520 may be performed according to the methods described herein. In certain examples, aspects of the operations of 1520 may be performed by a control channel candidate identifier as described with reference to FIGS. 6 through 9.

At 1525 the UE 115 may receive DCI for the UE based on the control channel candidate. The operations of 1525 may be performed according to the methods described herein. In certain examples, aspects of the operations of 1525 may be performed by a control channel candidate identifier as described with reference to FIGS. 6 through 9.

In some cases, the downlink message includes an indication of a monitoring window that identifies a number of slots for monitoring by the UE.

Figure 16:
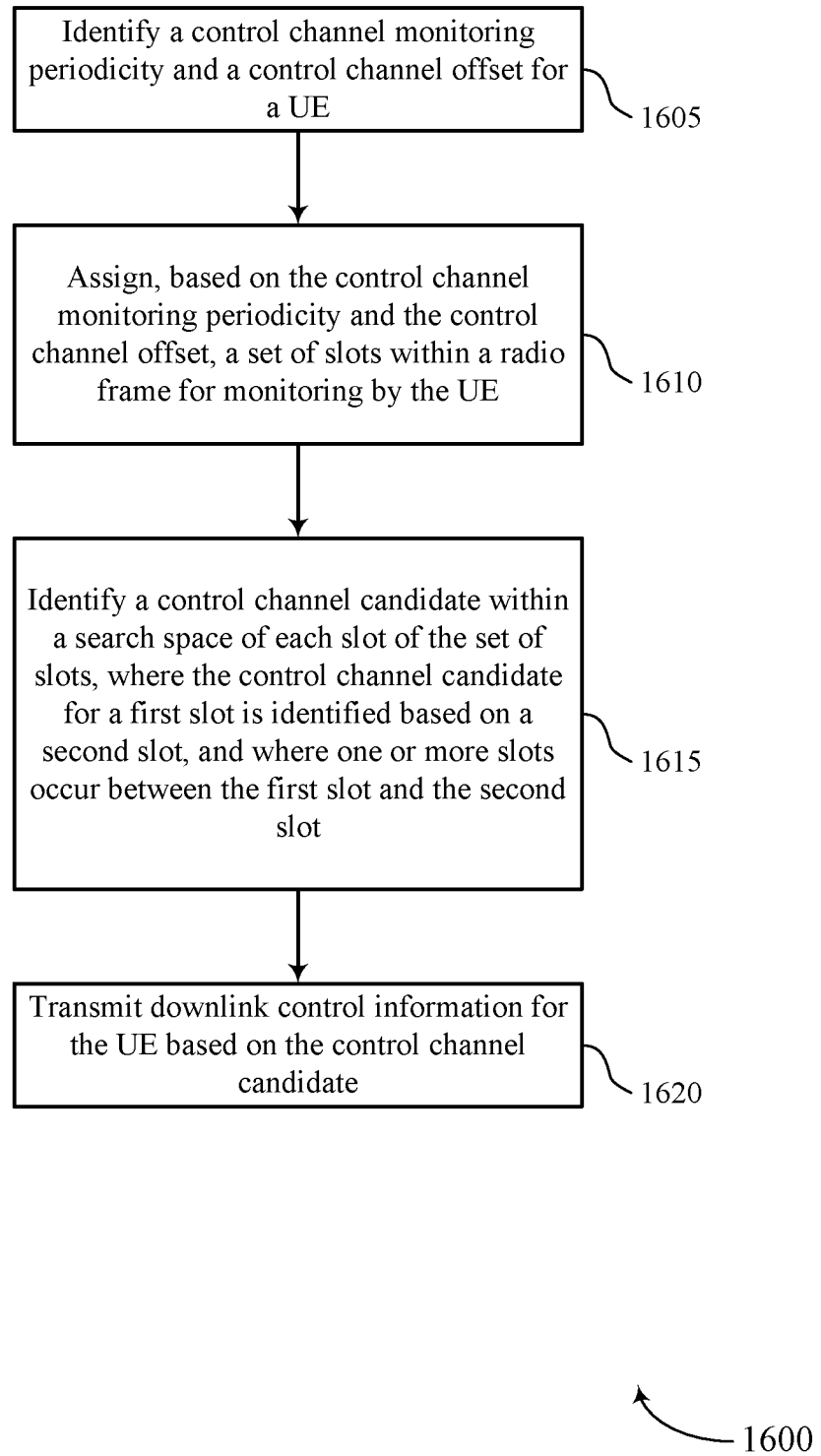

FIG. 16 shows a flowchart illustrating a method 1600 for control channel mapping within search space for wireless systems in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may identify a control channel monitoring periodicity and a control channel offset for a UE. The operations of 1605 may be performed according to the methods described herein. In certain examples, aspects of the operations of 1605 may be performed by a control channel information component as described with reference to FIGS. 10 through 13.

At 1610 the base station 105 may assign, based on the control channel monitoring periodicity and the control channel offset, a set of slots within a radio frame for monitoring by the UE. The operations of 1610 may be performed according to the methods described herein. In certain examples, aspects of the operations of 1610 may be performed by an assignment component as described with reference to FIGS. 10 through 13.

At 1615 the base station 105 may identify a control channel candidate within a search space of each slot of the set of slots, where the control channel candidate for a first slot is identified based on a second slot, and where one or more slots occur between the first slot and the second slot. The operations of 1615 may be performed according to the methods described herein. In certain examples, aspects of the operations of 1615 may be performed by a control channel candidate identifier as described with reference to FIGS. 10 through 13.

At 1620 the base station 105 may transmit DCI for the UE based on the control channel candidate. The operations of 1620 may be performed according to the methods described herein. In certain examples, aspects of the operations of 1620 may be performed by a DCI component as described with reference to FIGS. 10 through 13.

Figure 17:
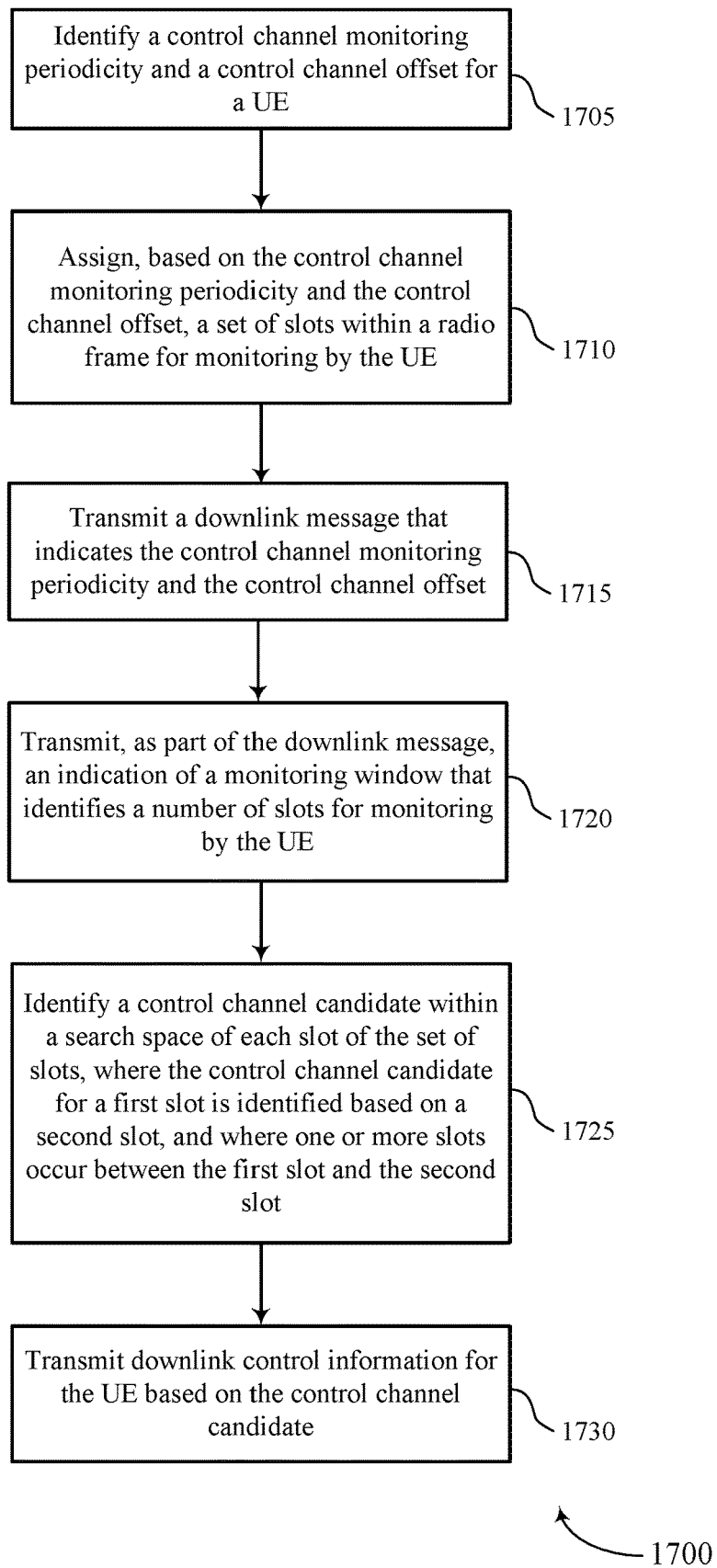

FIG. 17 shows a flowchart illustrating a method 1700 for control channel mapping within search space for wireless systems in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may identify a control channel monitoring periodicity and a control channel offset for a UE. The operations of 1705 may be performed according to the methods described herein. In certain examples, aspects of the operations of 1705 may be performed by a control channel information component as described with reference to FIGS. 10 through 13.

At 1710 the base station 105 may assign, based on the control channel monitoring periodicity and the control channel offset, a set of slots within a radio frame for monitoring by the UE. The operations of 1710 may be performed according to the methods described herein. In certain examples, aspects of the operations of 1710 may be performed by an assignment component as described with reference to FIGS. 10 through 13.

At 1715 the base station 105 may transmit a downlink message that indicates the control channel monitoring periodicity and the control channel offset. The operations of 1715 may be performed according to the methods described herein. In certain examples, aspects of the operations of 1715 may be performed by a control channel indication component as described with reference to FIGS. 10 through 13.

At 1720 the base station 105 may transmit, as part of the downlink message, an indication of a monitoring window that identifies a number of slots for monitoring by the UE. The operations of 1720 may be performed according to the methods described herein. In certain examples, aspects of the operations of 1720 may be performed by a monitoring window component as described with reference to FIGS. 10 through 13.

At 1725 the base station 105 may identify a control channel candidate within a search space of each slot of the set of slots, where the control channel candidate for a first slot is identified based on a second slot, and where one or more slots occur between the first slot and the second slot. The operations of 1725 may be performed according to the methods described herein. In certain examples, aspects of the operations of 1725 may be performed by a control channel candidate identifier as described with reference to FIGS. 10 through 13.

At 1730 the base station 105 may transmit DCI for the UE based on the control channel candidate. The operations of 1730 may be performed according to the methods described herein. In certain examples, aspects of the operations of 1730 may be performed by a DCI component as described with reference to FIGS. 10 through 13.

Figure 18:
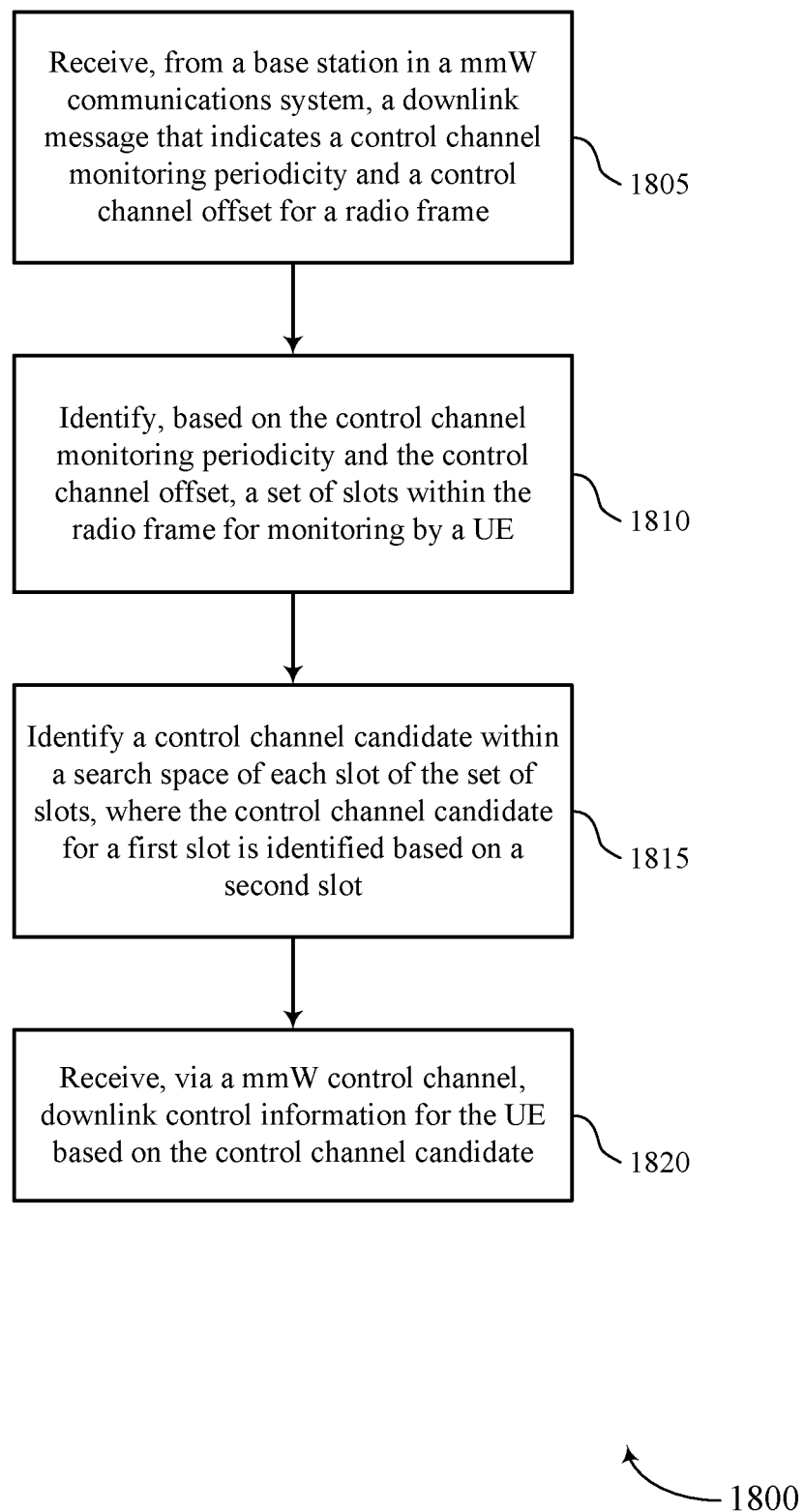

FIG. 18 shows a flowchart illustrating a method 1800 for control channel mapping within search space for wireless systems in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive, from a base station in a mmW communications system, a downlink message that indicates a control channel monitoring periodicity and a control channel offset for a radio frame. The operations of 1805 may be performed according to the methods described herein. In certain examples, aspects of the operations of 1805 may be performed by a control channel indication component as described with reference to FIGS. 6 through 9.

At 1810 the UE 115 may identify, based on the control channel monitoring periodicity and the control channel offset, a set of slots within the radio frame for monitoring by a UE. The operations of 1810 may be performed according to the methods described herein. In certain examples, aspects of the operations of 1810 may be performed by a control channel indication component as described with reference to FIGS. 6 through 9.

At 1815 the UE 115 may identify a control channel candidate within a search space of each slot of the set of slots, where the control channel candidate for a first slot is identified based on a second slot. The operations of 1815 may be performed according to the methods described herein. In certain examples, aspects of the operations of 1815 may be performed by a control channel candidate identifier as described with reference to FIGS. 6 through 9.

At 1820 the UE 115 may receive, via a mmW control channel, DCI for the UE based on the control channel candidate. The operations of 1820 may be performed according to the methods described herein. In certain examples, aspects of the operations of 1820 may be performed by a DCI component as described with reference to FIGS. 6 through 9.

Figure 19:
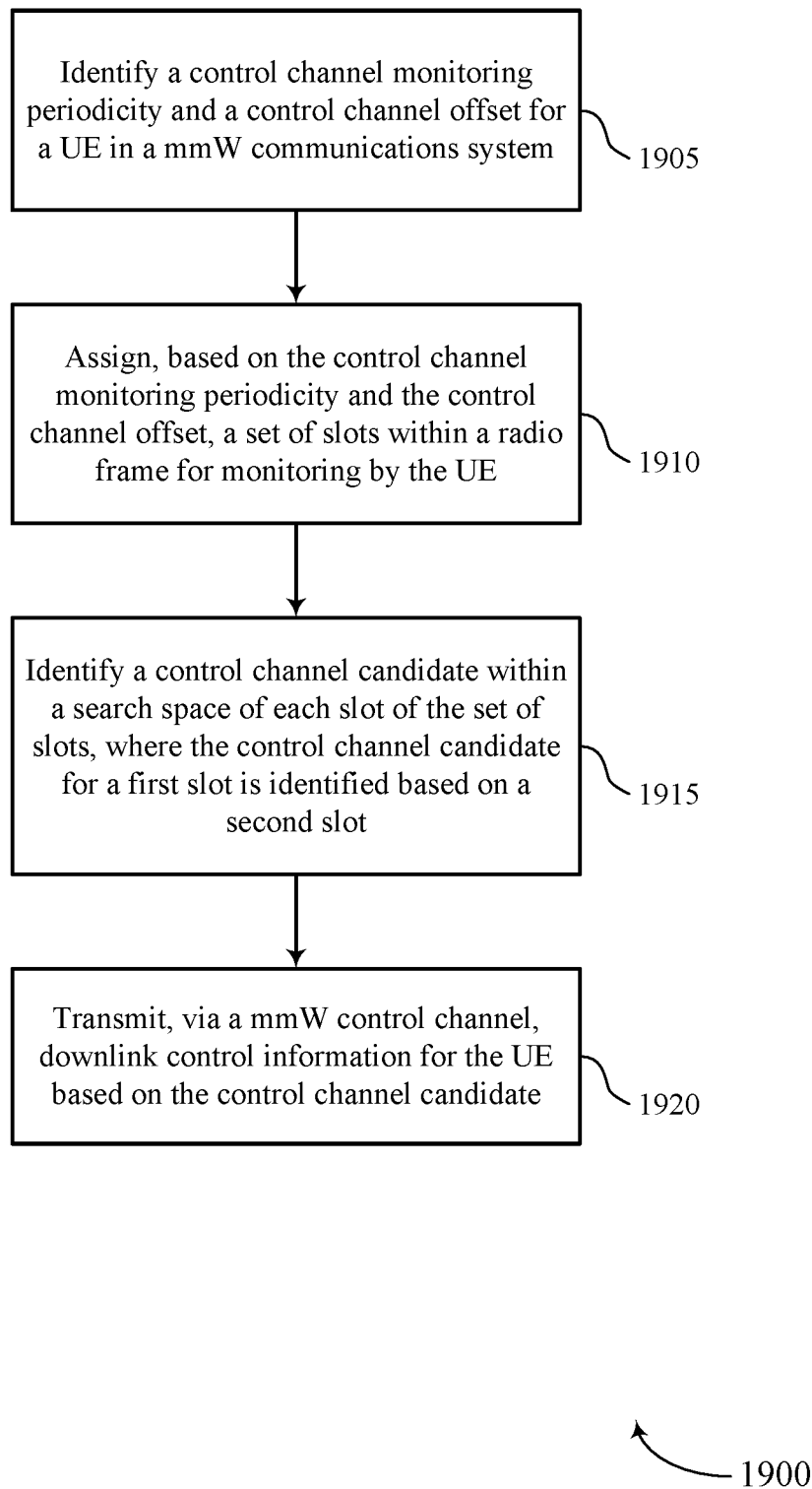

FIG. 19 shows a flowchart illustrating a method 1900 for control channel mapping within search space for wireless systems in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1905 the base station 105 may identify a control channel monitoring periodicity and a control channel offset for a UE in a mmW communications system. The operations of 1905 may be performed according to the methods described herein. In certain examples, aspects of the operations of 1905 may be performed by a control channel indication component as described with reference to FIGS. 10 through 13.

At 1910 the base station 105 may assign, based on the control channel monitoring periodicity and the control channel offset, a set of slots within a radio frame for monitoring by the UE. The operations of 1910 may be performed according to the methods described herein. In certain examples, aspects of the operations of 1910 may be performed by an assignment component as described with reference to FIGS. 10 through 13.

At 1915 the base station 105 may identify a control channel candidate within a search space of each slot of the set of slots, where the control channel candidate for a first slot is identified based on a second slot. The operations of 1915 may be performed according to the methods described herein. In certain examples, aspects of the operations of 1915 may be performed by a control channel candidate identifier as described with reference to FIGS. 10 through 13.

At 1920 the base station 105 may transmit, via a mmW control channel, DCI for the UE based on the control channel candidate. The operations of 1920 may be performed according to the methods described herein. In certain examples, aspects of the operations of 1920 may be performed by a DCI component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by ULEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        receive a downlink message that indicates a control channel monitoring periodicity and a control channel offset, wherein the control channel monitoring periodicity indicates a quantity of slots located between one or more control channel candidates of a set of slots for monitoring by the UE; and
        receive downlink control information for the UE based at least in part on a first control channel candidate within a search space of the set of slots and a control channel element (CCE) index for a first CCE of a set of CCEs within the search space, wherein the set of slots and the CCE index are based at least in part on the control channel monitoring periodicity and the control channel offset, and wherein the first control channel candidate for a first slot is based at least in part on a second slot, wherein the first slot and the second slot are configured for control channel monitoring, and wherein one or more slots occur between the first slot and the second slot based at least in part on the control channel monitoring periodicity.

2. The apparatus of claim 1, wherein the first slot and the second slot are nonconsecutive.

3. The apparatus of claim 1, wherein the first control channel candidate is based at least in part on a nonconsecutive slot indices for the first slot and the second slot.

4. The apparatus of claim 1, wherein the instructions to receive the downlink control information are executable by the processor to cause the apparatus to:
    receive the downlink control information in accordance with a value for a mapping variable for the first slot that is based at least in part on the value of the mapping variable for the second slot, the mapping variable associated with a location of the first control channel candidate.

5. The apparatus of claim 1, wherein the downlink message comprises an indication of a monitoring window that identifies the set of slots for monitoring.

6. The apparatus of claim 5, wherein the instructions are further executable by the processor to cause the apparatus to:
    monitor groups of multiple consecutive slots based at least in part on at least one of the monitoring window, the control channel monitoring periodicity, and the control channel offset.

7. The apparatus of claim 1, wherein the downlink message comprises an indication of a modulo operation for a time duration variable and the first control channel candidate is based at least in part on the modulo operation.

8. The apparatus of claim 7, wherein the time duration variable indicates a slot index.

9. The apparatus of claim 1, wherein the instructions to receive the downlink control information are executable by the processor to cause the apparatus to:
   monitor a set of physical downlink control channel (PDCCH) candidates within the search space based at least in part on the first control channel candidate.

10. The apparatus of claim 9, wherein the instructions are further executable by the processor to cause the apparatus to:
   receive a PDCCH payload for the UE based at least in part on the monitoring.

11. An apparatus for wireless communication, comprising:
   a processor;
   memory coupled with the processor; and
   instructions stored in the memory and executable by the processor to cause the apparatus to:
      transmit a downlink message that indicates a control channel monitoring periodicity and a control channel offset for a user equipment (UE), wherein the control channel monitoring periodicity indicates a quantity of slots located between one or more control channel candidates of a set of slots for monitoring by the UE; and
      transmit downlink control information for the UE based at least in part on a first control channel candidate within a search space of the set of slots and a control channel element (CCE) index for a first CCE of a set of CCEs within the search space, wherein the set of slots and the CCE index are based at least in part on the control channel monitoring periodicity and the control channel offset, and wherein the first control channel candidate for a first slot is based at least in part on a second slot, wherein the first slot and the second slot are configured for control channel monitoring, and wherein one or more slots occur between the first slot and the second slot based at least in part on the control channel monitoring periodicity.

12. The apparatus of claim 11, wherein the first slot and the second slot are nonconsecutive.

13. The apparatus of claim 11, wherein the first control channel candidate is based at least in part on a nonconsecutive slot indices for the first slot and the second slot.

14. The apparatus of claim 11, wherein the instructions to transmit the downlink control information are executable by the processor to cause the apparatus to:
   transmit the downlink control information in accordance with a value for a mapping variable for the first slot that is based at least in part on the value of the mapping variable for the second slot, the mapping variable associated with a location of the first control channel candidate.

15. The apparatus of claim 11, wherein the downlink message comprises an indication of a monitoring window that identifies the set of slots for monitoring.

16. The apparatus of claim 15, wherein the downlink message comprises one or more groups of multiple consecutive slots for monitoring based at least in part on at least one of the monitoring window, the control channel monitoring periodicity, and the control channel offset.

17. The apparatus of claim 11, wherein the downlink message comprises an indication of a modulo operation for a time duration variable and the first control channel candidate is based at least in part on the modulo operation.

18. The apparatus of claim 17, wherein the time duration variable indicates a slot index.

19. The apparatus of claim 11, wherein the instructions to transmit the downlink control information are executable by the processor to cause the apparatus to:
   transmit a physical downlink control channel (PDCCH) payload for the UE.

20. An apparatus for wireless communication, comprising:
   a processor;
   memory coupled with the processor; and
   instructions stored in the memory and executable by the processor to cause the apparatus to:
      receive, in a millimeter wave (mmW) communications system, a downlink message that indicates a control channel monitoring periodicity and a control channel offset wherein the control channel monitoring periodicity indicates a quantity of slots located between one or more control channel candidates of a set of slots for monitoring; and
      receive, via a mmW control channel, downlink control information for a user equipment (UE) based at least in part on a first control channel candidate within a search space of the set of slots and a control channel element (CCE) index for a first CCE of a set of CCEs within the search space, wherein the set of slots and the CCE index are based at least in part on the control channel monitoring periodicity and the control channel offset, and wherein the first control channel candidate for a first slot is based at least in part on a second slot, wherein the first slot and the second slot are configured for control channel monitoring based at least in part on the control channel monitoring periodicity.

21. The apparatus of claim 20, wherein the first slot and the second slot are nonconsecutive.

22. The apparatus of claim 20, wherein the first control channel candidate is based at least in part on a nonconsecutive slot indices for the first slot and the second slot.

23. The apparatus of claim 20, wherein the instructions to receive the downlink control information are executable by the processor to cause the apparatus to:
   receive the downlink control information in accordance with a value for a mapping variable for the first slot that is based at least in part on the value of the mapping variable for the second slot, wherein the first slot and the second slot are consecutive.

24. The apparatus of claim 20, wherein the downlink message comprises an indication of a monitoring window that identifies the set of slots for monitoring.

25. The apparatus of claim 24, wherein the instructions are further executable by the processor to cause the apparatus to:
   monitor groups of multiple consecutive slots based at least in part on at least one of the monitoring window, the control channel monitoring periodicity, and the control channel offset.

26. An apparatus for wireless communication, comprising:
   a processor;
   memory coupled with the processor; and
   instructions stored in the memory and executable by the processor to cause the apparatus to:
      transmit a downlink message that indicates a control channel monitoring periodicity and a control channel offset for a user equipment (UE) in a millimeter wave (mmW) communications system, wherein the control channel monitoring periodicity indicates a quantity of slots located between one or more control channel candidates of a set of slots for monitoring by the UE; and transmit downlink control information for the UE based at least in part on a first control channel candidate within a search space of the set of slots and a control channel element (CCE) index for a first CCE of a set of CCEs within the search space, wherein the set of slots and the CCE index are based at least in part on the control channel monitoring periodicity and the control channel offset, and wherein the first control channel candidate for a first slot is based at least in part on a second slot, wherein the first slot and the second slot are configured for control channel monitoring based at least in part on the control channel monitoring periodicity.

27. The apparatus of claim 26, wherein the first slot and the second slot identified for the first control channel candidate are nonconsecutive.

28. The apparatus of claim 26, wherein the first control channel candidate is based at least in part on a nonconsecutive slot indices for the first slot and the second slot.

29. The apparatus of claim 26, wherein the instructions to transmit the downlink control information are executable by the processor to cause the apparatus to:
  transmit the downlink control information in accordance with a value for a mapping variable for the first slot that is based at least in part on the value of the mapping variable for the second slot, wherein the first slot and the second slot are consecutive.

30. The apparatus of claim 26, wherein the downlink message comprises an indication of a monitoring window that identifies the set of slots for monitoring, and wherein the instructions are further executable by the processor to cause the apparatus to:
  monitor groups of multiple consecutive slots based at least in part on at least one of the monitoring window, the control channel monitoring periodicity, and the control channel offset.

* * * * *